US011922316B2

(12) United States Patent
Tripathi et al.

(10) Patent No.: US 11,922,316 B2
(45) Date of Patent: Mar. 5, 2024

(54) TRAINING A NEURAL NETWORK USING PERIODIC SAMPLING OVER MODEL WEIGHTS

(71) Applicant: LG ELECTRONICS INC., Seoul (KR)

(72) Inventors: Samarth Tripathi, Mountain View, CA (US); Jiayi Liu, Fremont, CA (US); Unmesh Kurup, Sunnyvale, CA (US); Mohak Shah, Dublin, CA (US)

(73) Assignee: LG ELECTRONICS INC., Seoul (KR)

( * ) Notice: Subject to any disclaimer, the term of this patent is extended or adjusted under 35 U.S.C. 154(b) by 702 days.

(21) Appl. No.: 16/993,147

(22) Filed: Aug. 13, 2020

(65) Prior Publication Data

US 2021/0110274 A1   Apr. 15, 2021

Related U.S. Application Data

(60) Provisional application No. 62/915,032, filed on Oct. 15, 2019.

(51) Int. Cl.
*G06N 3/084* (2023.01)
*G06F 17/18* (2006.01)
(Continued)

(52) U.S. Cl.
CPC ............ *G06N 3/084* (2013.01); *G06F 17/18* (2013.01); *G06F 18/10* (2023.01); *G06N 5/046* (2013.01)

(58) Field of Classification Search
CPC ........ G06N 3/084; G06N 5/046; G06F 18/10; G06F 17/18
See application file for complete search history.

(56) References Cited

U.S. PATENT DOCUMENTS

2016/0162781 A1   6/2016   Lillicrap et al.
2016/0247064 A1   8/2016   Yoo et al.
(Continued)

FOREIGN PATENT DOCUMENTS

KR   20160102690   8/2016
WO   2018140294    8/2018
WO   2019083578    5/2019

OTHER PUBLICATIONS

Chen et al., Decaying Momentum Helps Neural Network Training, Oct. 2019. (Year: 2019).*
(Continued)

*Primary Examiner* — Kamran Afshar
*Assistant Examiner* — Marshall L Werner
(74) *Attorney, Agent, or Firm* — LEE, HONG, DEGERMAN, KANG & WAIMEY

(57) ABSTRACT

A computer-implemented method includes: initializing model parameters for training a neural network; performing a forward pass and backpropagation for a first minibatch of training data; determining a new weight value for each of a plurality of nodes of the neural network using a gradient descent of the first minibatch; for each determined new weight value, determining whether to update a running mean corresponding to a weight of a particular node; based on a determination to update the running mean, calculating a new mean weight value for the particular node using the determined new weight value; updating the weight parameters for all nodes based on the calculated new mean weight values corresponding to each node; assigning the running mean as the weight for the particular node when training on the first minibatch is completed; and reinitializing running means for all nodes at a start of training a second minibatch.

13 Claims, 27 Drawing Sheets

(51) Int. Cl.
G06F 18/10 (2023.01)
G06N 5/046 (2023.01)

(56) References Cited

U.S. PATENT DOCUMENTS

2017/0278018 A1 9/2017 Mnih et al.
2020/0250515 A1 8/2020 Rifkin et al.

OTHER PUBLICATIONS

Smith, Leslie N., Cyclical Learning Rates for Training Neural Networks, Apr. 2017. (Year: 2017).*
Izmailov et al., Averaging Weights Leads to Wider Optima and Better Generalization, Feb. 2019. (Year: 2019).*
Samarth Tripathi, et al., "Robust Neural Network Training Using Periodic Sampling over Model Weights" [online], arXiv: 1905.05774v1 [cs.LG], May 2019, 10 pages.
PCT International Application No. PCT/KR2020/012379, Written Opinion of the International Searching Authority dated Dec. 1, 2020, 10 pages.
Mykhaylo Andriluka, et al., "2D Human Pose Estimation: New Benchmark and State of the Art Analysis", in IEEE Conference on Computer Vision and Pattern Recognition (CVPR), 2014, 8 pages.
Cody Coleman, et al., "DAWN-Bench: An End-to-End Deep Learning Benchmark and Competition", NIPS ML Systems Workshop 2017, 10 pages.
Jia Deng, et al., "Imagenet: A large-scale hierarchical image database", In Computer Vision and Pattern Recognition, CVPR 2009, IEEE Conference on., 8 pages.
John Duchi, et al., Adaptive subgradient methods for online learning and stochastic optimization. The Journal of Machine Learning Research, Jul. 12, 2011, 39 pages.
Kaiming He, et al., "Deep residual learning for image recognition", In Proceedings of the IEEE conference on computer vision and pattern recognition, 2016, 39 pages.
Sepp Hochreiter, et al., "Flat Minima", Neural Computation, 1997, 42 pages.
Gao Huang, et al., "Densely Connected Convolutional Networks", In CVPR, vol. 1.3., 2017, 9 pages.
Sergey Ioffe, et al., "Batch normalization: Accelerating deep network training by reducing internal covariate",arXiv: 1502.03167, 2015, 11 pages.
Pavel Izamailov, et al., "Averaging Weights lead to Wider Optima and Better Generalization", Mar. 2018, https://doi.org/arXiv:1803.05407, 10 pages.

Kenji Kawaguchi, "Deep learning without poor local minima", In Advances in Neural Information Processing Systems, 2016, 9 pages.
Nitish Keskar, et al., "Improving generalization performance by switching from adam to sgd", arXiv: 1712.07628, 2017, 10 pages.
Diederik P. Kingma, et al., "Adam: A method for stochastic optimization", arXiv: 1412.6980, 2014, 15 pages.
Alex Krizhevsky, "Learning multiple layers of features from tiny images", Technical Report, Apr, 8, 2009, 60 pages.
S. Lastote-Julien, et al., "A simpler approach to obtaining an O(1/t) convergence rate for the projected stochastic subgradient method", arXiv: 1212.2002, Dec. 21, 2012, 8 pages.
Hao Li, et al., "Visualizing the Loss Landscape of Neural Nets", arXiv: 1712.09913, 2017, 11 pages.
Tsung-Yi Lin, et al., "Microsoft Coco: Common objects in context", In European conference on computer vision, 2014, 15 pages.
Francis Bach, et al., "Non-Asymptotic Analysis of Stochastic Approximation Algorithms for Machine Learning", In Advances in Neural Information Processing Systems, 2011, 32 pages.
Chao Peng, et al., "MegDet: A Large Mini-Batch Object Detector", arXiv: 1711.072407, 2017, 9 pages.
Mark Sandler, et al., "MobileNetV2: Inverted Residuals and Linear Bottlenecks", In Proceedings of the IEEE Conference on Computer Vision and Pattern Recognition, 2018, 11 pages.
Samuel L. Smith, et al., "Don't decay the learning rate, increase the batch size", arXiv: 1711.00489, 2017, 11 pages.
Christian Szegedy, et al., "Rethinking the Inception Architecture for Computer Vision", In Proceedings of the IEEE Conference on computer vision and pattern recognition, 2016, 9 pages.
Hinton et al., "Lecture 6.e: Divide the gradient by a running average of its recent magnitude", Coursera: Neural networks for machine learning, 2012, 31 pages.
Bin Xiao, et al., "Simple baselines for Human Pose Estimation and Tracking", arXiv: 1804.06208, 2018, 16 pages.
Tete Xiao, et al., "Unified Perceptual Parsing for Scene Understanding", arXiv:1807.10221, 2018, 17 pages.
Bolei Zhou, et al., "Semantic Understanding of Scenes Through the ADE20K Dataset", arXiv:1608.05442, 2016, 20 pages.
Bolei Zhou, et al., "Scene parsing through ADE20k dataset", In Proceedings of the IEEE Conference on Computer Vision and Pattern Recognition, vol. 1. IEEE, 2017, 10 pages.
European Patent Office Application Serial No. 20876034.8, Search Report dated Oct. 6, 2023, 10 pages.
Maddox et al. "A Simple Baseline for Bayesian Uncertainty in Deep Learning," arXin.org, Cornell University Library, 201 Olin Library Cornell University Ithaca, NY, Feb. 2019, 25 pages.

* cited by examiner

| | Standard Deviation last 20 epochs | Standard Deviation epochs 20-30 | Mean last 20 epochs |
|---|---|---|---|
| SGD | 0.080 | 1.06 | 76.16 |
| PSWA | 0.058 | 0.39 | 74.77 |
| PWALKS k=5 | 0.045 | 0.31 | 76.35 |
| PWALKS k=2.5 | 0.047 | 0.21 | 76.50 |
| PSWM m=0.9 | 0.047 | 0.39 | 75.97 |
| PSWM m=0.5 | 0.056 | 0.24 | 76.16 |

Figure 19A

|  | consecutive epochs with improvement | consecutive epochs stable improvement | epochs with stable improvement over all previous epochs |
| --- | --- | --- | --- |
| SGD | 57% | 77% | 77% |
| PSWA | 70% | 95% | 99% |
| PWALKS k=5 | 66% | 93% | 95% |
| PWALKS k=2 | 65% | 89% | 97% |
| PSWM m=0.9 | 60% | 85% | 91% |
| PSWM m=0.5 | 65% | 85% | 90% |

Figure 19B

| | Average Improvement over SGD accuracy for all epochs | Average Improvement over SGD accuracy for first 30 epochs |
|---|---|---|
| PSWA | 2.75 | 12.52 |
| PWALKS k=5 | 3.71 | 13.31 |
| PWALKS k=2.5 | 3.50 | 12.37 |
| PSWM m=0.9 | 1.05 | 4.68 |
| PSWM m=0.5 | 2.01 | 7.81 |

Figure 19C

TRAINING A NEURAL NETWORK USING PERIODIC SAMPLING OVER MODEL WEIGHTS

CROSS REFERENCE TO RELATED APPLICATION(S)

Pursuant to 35 U.S.C. § 119(e), this application claims the benefit of U.S. Provisional Patent Application Ser. No. 62/915,032, filed on Oct. 15, 2019, the contents of which are hereby incorporated by reference herein in its entirety.

FIELD

The present disclosure generally relates to training a neural network using periodic sampling of model weights for providing consistent and more robust convergence.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms construct a specific model in order to obtain the prediction or the determination based on the input data, rather than performing strictly defined static program instructions.

Deep learning and deep neural networks (DNNs) are a sub-field of machine learning in artificial intelligence (A.I.) that deals with algorithms inspired from the biological structure and functioning of a brain to aid machines with intelligence. Generally, DNNs are defined as a set of machine learning algorithms which attempts a high level of abstraction through a combination of several nonlinear transformations and is a field of machine learning which teaches computers a way of thinking similar to a human in a large framework.

Accordingly, DNNs are well suited for solving a number of computer vision problems such as segmentation, pose detection, classification, or the like. However, training the DNNs is both computationally intensive and requires fine-tuning various hyperparameters. In addition, the performances of the DNNs may swing widely as the network converges making it hard to decide when to stop training.

Moreover, optimizing DNNs is especially challenging due to the nonconvex nature of their loss function. Most optimization problems in deep learning are non-convex where the path taken by the optimization algorithm is quite complicated. Hence, the development of gradient-based methods that use back-propagation to approximate optimal solutions has been crucial for neural network adoption.

Optimization techniques over gradient updates such as Stochastic Gradient Descent (SGD) or gradient-based adaptive optimizers have made the training process more effective. However, optimal convergence of the loss function is still time-consuming, volatile, and also requires many finely tuned hyperparameters. Deep learning has become a de facto tool for a number of machine learning problems, but these DNNs need to be carefully fine-tuned and there exists no optimal training regime that works over the wide variety of available datasets and learning methods.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 19A to 19C show a performance results of training ResNet50 on ImageNet with PSWA, PWALKS, and PSWM in accordance with some implementations.

Figure 1:
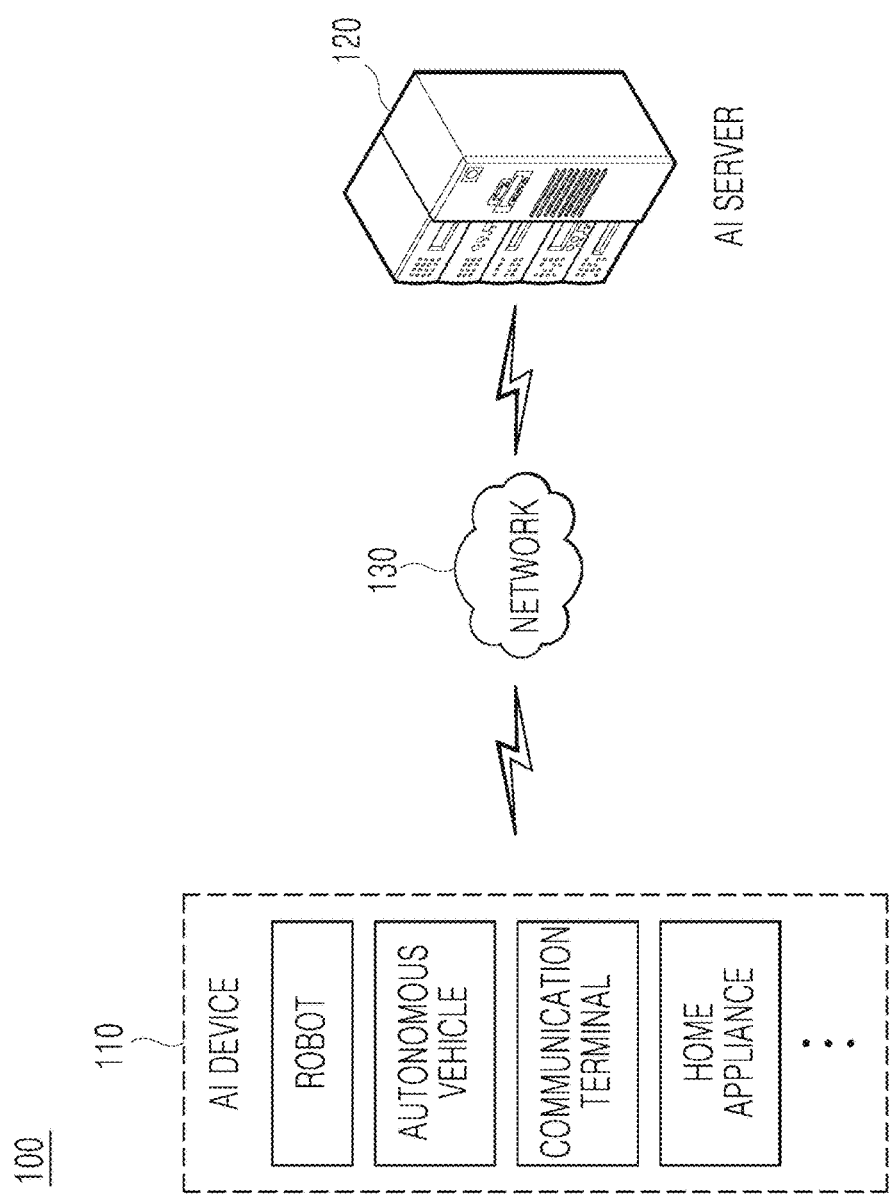
FIG. 1 is a view illustrating an example of an AI system comprising an AI device, an AI server, and a network connecting the above-mentioned components in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

An object of the present disclosure is to train a neural network using periodic sampling of model weights to provide consistent and more robust convergence to support a variety of computer vision problems. The proposed techniques (e.g., PSWA, PWALKS, and PSWM) provide increased robustness and stability to the neural network training process while providing substantial intermediate performance improvements without compromising an optimal convergence. This is especially useful when the most optimal hyperparameter values or learning rate schedules are unknown as these techniques provide a better starting point.

In addition, the techniques can provide significant improvements for many AI applications. For example, PSWA's robust and stable performance can uniquely benefit deployed DNN models training over continuous streaming data to ensure that performances do not fluctuate depending on a current batch. In addition, the PSWA, PWALKS, and PSWM techniques can improve machine learning on edge devices, which have limited computational power available and, hence, require training at a high learning rate over short time periods. The PSWA, PWALKS, and PSWM techniques also provide significant performance improvement under these conditions. DNN models that are trained to achieve a certain performance threshold in a shortest training time period can also be further improved because PSWA adds a strong regularization at high learning rates.

An implementation of the present disclosure includes a computer-implemented method for training a neural network, the method comprising: initializing one or more model parameters for training the neural network; initializing running means for all nodes in the neural network; performing a forward pass and a back propagation for a minibatch of training data among a plurality of batches of training data; determining a new weight value for each of a plurality of nodes of the neural network based on one or more gradient descent of the first minibatch; for each determined new weight value, determining whether to update a running mean corresponding to a weight of a particular node from the plurality of nodes; based on a determination to update the running mean, calculating a new mean weight value for the particular node using the determined new weight value; updating the weight parameters for all nodes based on the calculated new mean weight values corresponding to each node; assigning the running mean as the weight for the particular node when training on the first minibatch is completed; and reinitializing running means for all nodes in the neural network at a start of training a second minibatch of training data.

In some implementations, the computer-implemented method may include wherein determining whether to update the running mean is based on performing a random determination having a probability based on a value included in the one or more model parameters. In some implementations, the computer-implemented method may further comprise storing the running mean corresponding to the weight of the particular node before updating the running mean as a current running mean, wherein the running mean is reinitialized to a value of the stored current running mean.

In some implementations, the value included in the one or more model parameters may be a percentage representing a desired sampling percentage of the first minibatch for updating the running mean.

In some implementations, the determination of whether to update the running mean corresponding to the weight of the particular node further comprises determining whether the batch of training data falls within a last particular number of batches of the first minibatch before performing the random determination.

In some implementations, the one or more model parameters may include a percentage value representing a last particular number of batches with respect to a total number of batches of the first minibatch.

In some implementations, when the batch of training data does not fall within the last particular number of batches of the first minibatch, the running mean may not be updated using the determined new weight value.

In some implementations, the computer-implemented method may further comprise reinitializing the running mean for the particular node for performing training on the second minibatch of training data.

In some implementations, the percentage value may represent the last particular number of batches is in a range of 2 to 5%.

In some implementations, the determined new weight value may be based on a running momentum term included in the one or more model parameter. In some implementations, the running mean may be updated after each batch such that new weight values for calculating the new weighted mean are increasingly weighted toward an end of the first minibatch.

Another implementation of the present disclosure includes an edge device comprising one or more processors; a non-transitory memory; and one or more programs stored in the non-transitory memory, which, when executed by the one or more processors, cause the edge device to be configured to perform: initializing one or more model parameters for training a neural network; performing a forward pass and back propagation using a first minibatch of training data from among a plurality of batches of training data; determining a new weight value for each of a plurality of nodes of the neural network based on one or more gradient descent of the first minibatch; for each determined new weight value, determining whether to update a running mean corresponding to a weight of a particular node from the plurality of nodes; based on a determination to update the running mean, calculating a new mean weight value for the particular node using the determined new weight value; updating the weight parameters for all nodes based on the calculated new mean weight value corresponding to each node; assigning the running mean as the weight for the particular node when training on the first minibatch is completed; and reinitializing running means for all nodes in the neural network at a start of training a second minibatch of training data.

Yet another implementation of the present disclosure includes a non-transitory memory storing one or more programs, which, when executed by the one or more processors of an edge device, cause the edge device to be configured to perform: initializing one or more model parameters for training a neural network; performing a forward pass and back propagation using a first minibatch of training data from among a plurality of batches of training data; determining a new weight value for each of a plurality of nodes of the neural network based on one or more gradient descent of the first minibatch; for each determined new weight value, determining whether to update a running mean corresponding to a weight of a particular node from the plurality of nodes; based on a determination to update the running mean, calculating a new mean weight value for the particular node using the determined new weight value; updating the weight parameters for all nodes based on the calculated new mean weight value corresponding to each node; assigning the running mean as the weight for the particular node when training on the first minibatch is completed; and reinitializing running means for all nodes in the neural network at a start of training a second minibatch of training data.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

The present disclosure is not limited to what has been described above, and other aspects and advantages of the present disclosure not mentioned above will be understood through the following description of implementations of the present disclosure. Further, it will be understood that the aspects and advantages of the present disclosure may be achieved by the configurations described in claims and combinations thereof.

DETAILED DESCRIPTION

Hereinafter, the implementations disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the implementations presented herein are not limited by the accompanying drawings. As such, the present disclosure should be construed to extend to any alterations, equivalents, and substitutes in addition to those which are particularly set out in the accompanying drawings.

The terminology used herein is used for the purpose of describing particular example implementations only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, implementations of the present disclosure will be described in detail with reference to the accompanying drawings. Like reference numerals designate like elements throughout the specification, and overlapping descriptions of the elements will not be provided.

FIG. 1 is a view illustrating an example of an AI system including an AI device, an AI server, and a network connecting the above-mentioned components. While pertinent features are shown, those of ordinary skill in the art will appreciate from the present disclosure that various other features have not been illustrated for the sake of brevity and so as not to obscure more pertinent aspects of the example implementations disclosed herein.

Referring to FIG. 1, the AI device 100 may include an artificial intelligence based object identifying apparatus of the present disclosure and for example, include at least one of a robot, an autonomous vehicle, a communication terminal (for example, a mobile phone, a smart phone, or a tablet PC), an edge device (not shown in FIG. 1) (e.g., the edge device 200 shown in FIG. 2), and a home appliance (for example, a robot cleaner).

Here, artificial intelligence refers to a field of studying artificial intelligence or a methodology to create the artificial intelligence and machine learning refers to a field of defining various problems treated in the artificial intelligence field and studying a methodology to solve the problems. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may train an artificial neural network by supervised learning.

Supervised learning may refer to a method for training an artificial neural network with training data that has been given a label. In addition, the label may refer to a target answer (or a result value) to be guessed by the artificial neural network when the training data is inputted to the artificial neural network.

As a result, the artificial intelligence based object identifying apparatus trains the artificial neural network using a machine learning algorithm or requests a trained artificial neural network from the AI server 120 to receive the trained artificial neural network from the AI server 120. Further, when the image is received, the object identifying apparatus may estimate a type of the object in the received image using the trained artificial neural network.

When the AI server 120 receives the request for the trained artificial neural network from the AI device 110, the AI server 120 may train the artificial neural network using the machine learning algorithm and provide the trained artificial neural network to the AI device 110. The AI server 120 may be composed of a plurality of servers to perform distributed processing. In this case, the AI server 120 may be included as a configuration of a portion of the AI device 110, and may thus perform at least a portion of the AI processing together.

The network 130 may connect the AI device 110 and the AI server 120. The network 130 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 130 may also send and receive information using short distance communication and/or long distance communication. The short-range communication may include Bluetooth®, radio frequency identification (RFID), infrared data association (IrDA), ultra-wideband (UWB), ZigBee, and Wi-Fi (wireless fidelity) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The network 130 may include connection of network elements such as a hub, a bridge, a router, a switch, and a gateway. The network 130 can include one or more connected networks, for example, a multi-network environment, including a public network such as an internet and a private network such as a safe corporate private network. Access to the network 130 may be provided through one or more wire-based or wireless access networks. Furthermore, the network 130 may support the Internet of Things (IoT) network for exchanging and processing information between distributed elements such as things, 3G, 4G, Long Term Evolution (LTE), 5G communications, or the like.

Figure 2:
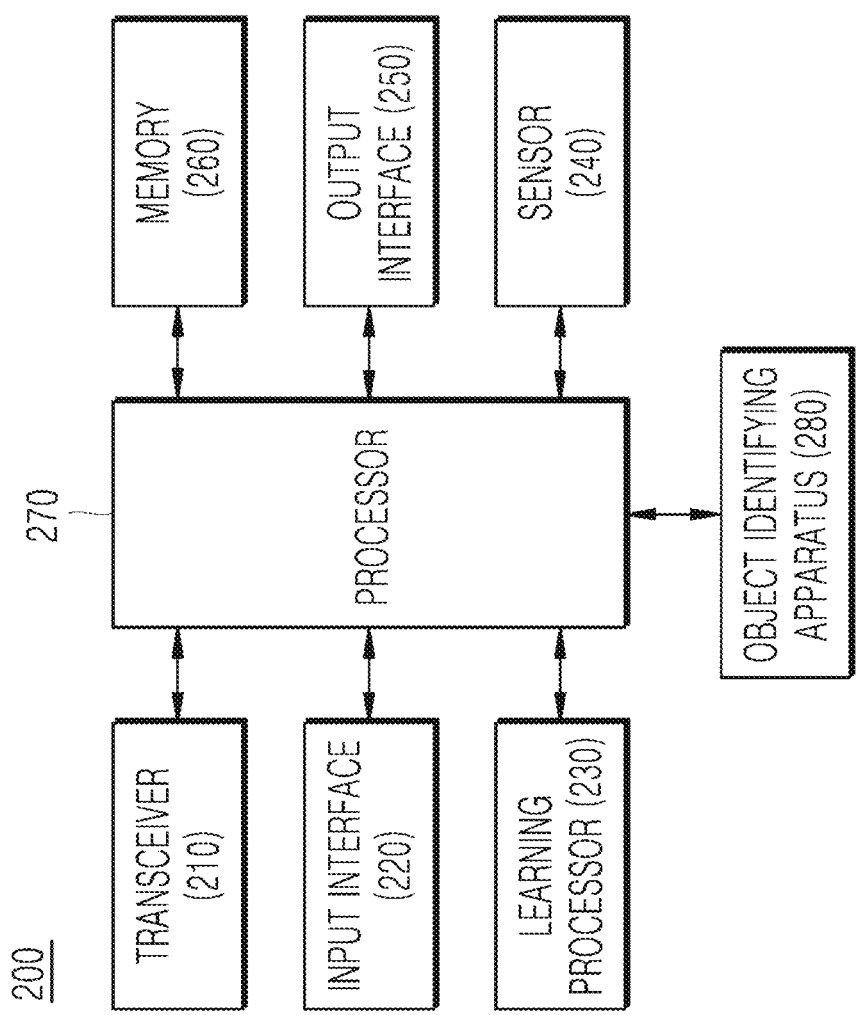
FIG. 2 is a view illustrating a configuration of an edge device including an object identifying apparatus in accordance with some implementations.

FIG. 2 is a view illustrating a configuration of an edge device including an object identifying apparatus according to an implementation of the present disclosure.

Referring to FIG. 2, the AI device (e.g., the AI device 110 shown in FIG. 1) or the edge device 200 includes a transceiver 210, an input interface 220, a learning processor 230, a sensor 240, an output interface 250, a memory 260, a processor 270, and an object identifying apparatus 280.

The transceiver 210 may transmit or receive data to/from external devices such as other AI device or AI server using wireless/wired communication techniques. For example, the transceiver 210 may transmit or receive sensor data, user input, a learning model, a control signal, and the like with the external devices.

In this case, the communications technology used by the transceiver 210 may be technology such as global system for mobile communication (GSM), code division multi access (CDMA), long term evolution (LTE), 5G, wireless LAN (WLAN), Wi-Fi, Bluetooth™, radio frequency identification (RFID), infrared data association (IrDA), ZigBee, and near field communication (NFC).

The input interface 220 may obtain various types of data. The input interface 220 may include a camera for inputting an image signal, a microphone for receiving an audio signal, and a user input interface for receiving information inputted from a user. Here, the camera or the microphone is treated as a sensor so that a signal obtained from the camera or the microphone may also be referred to as sensing data or sensor information.

The input interface 220 may obtain, for example, learning data for model learning and input data used when output is obtained using a learning model. The input interface 220 may obtain raw input data. In this case, the processor 270 or the learning processor 230 may extract an input feature by preprocessing the input data.

The learning processor 230 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion. The learning processor 230 may perform AI processing together with a learning processor of the AI server (e.g., the AI server 120 shown in FIG. 1).

Further, the learning processor 230 may include a memory which is integrated or implemented in the edge device 200, but is not limited thereto and may be implemented using an external memory directly coupled to the edge device or a memory sustained in the external device.

The sensor 240 may obtain at least one of internal information of the edge device 200, surrounding environment information of the edge device 200, or user information by using various sensors. The sensor 240 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output interface 250 may generate a visual, auditory, or tactile related output. The output interface 250 may include a display outputting visual information, a speaker outputting auditory information, and a haptic module outputting tactile information.

The memory 260 may store data supporting various functions of the edge device 200. For example, the memory 260 may store input data, the learning data, the learning model, learning history, or the like, obtained from the input interface 220.

The memory 260 may serve to temporarily or permanently store data processed by the processor 270. Here, the memory 260 may include magnetic storage media or flash storage media, but the scope of the present disclosure is not limited thereto. The memory 260 as described above may include magnetic storage media or flash storage media, but the scope of the present disclosure is not limited thereto. The memory 260 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 270 may determine at least one executable operation of the edge device 200 based on information determined or generated by using a data analysis algorithm or a machine learning algorithm. In addition, the processor 270 may control components of the edge device 200 to perform the determined operation.

To this end, the processor 270 may request, retrieve, receive, or use data of the learning processor 230 or the memory 260, and may control components of the edge device 200 to execute a predicted operation or an operation determined to be preferable of the at least one executable operation.

In this case, when it is required to be linked with the external device to perform the determined operation, the processor 270 may generate a control signal for controlling the external device and transmit the generated control signal to the corresponding external device.

The processor 270 obtains intent information about user input, and may determine a requirement of a user based on the obtained intent information. The processor 270 may obtain intent information corresponding to user input by using at least one of a speech to text (STT) engine for converting voice input into a character string or a natural language processing (NLP) engine for obtaining intent information of a natural language.

In an implementation, the at least one of the STT engine or the NLP engine may be composed of artificial neural networks, some of which are trained according to a machine learning algorithm. In addition, the at least one of the STT engine or the NLP engine may be trained by the learning processor 230, trained by a learning processor of an AI server, or trained by distributed processing thereof.

The processor 270 collects history information including, for example, operation contents and user feedback on an operation of the edge device 200, and stores the history information in the memory 260 or the learning processor 230, or transmits the history information to an external device such as an AI server (e.g., the AI server shown in FIG. 1). The collected history information may be used to update a learning model.

The processor 270 may control at least some of components of the edge device 200 to drive an application stored in the memory 260. Furthermore, the processor 270 may operate two or more components included in the edge device 200 in combination with each other to drive the application.

The object identifying apparatus 280 may include a receiver, a learner, a memory with a low capacity, an image modifier, and an object determinator. Here, the receiver may be included in the input interface 220, the learner may be included in the learning processor 230, and the memory with a low capacity may be included in the memory 260.

Moreover, FIG. 2 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
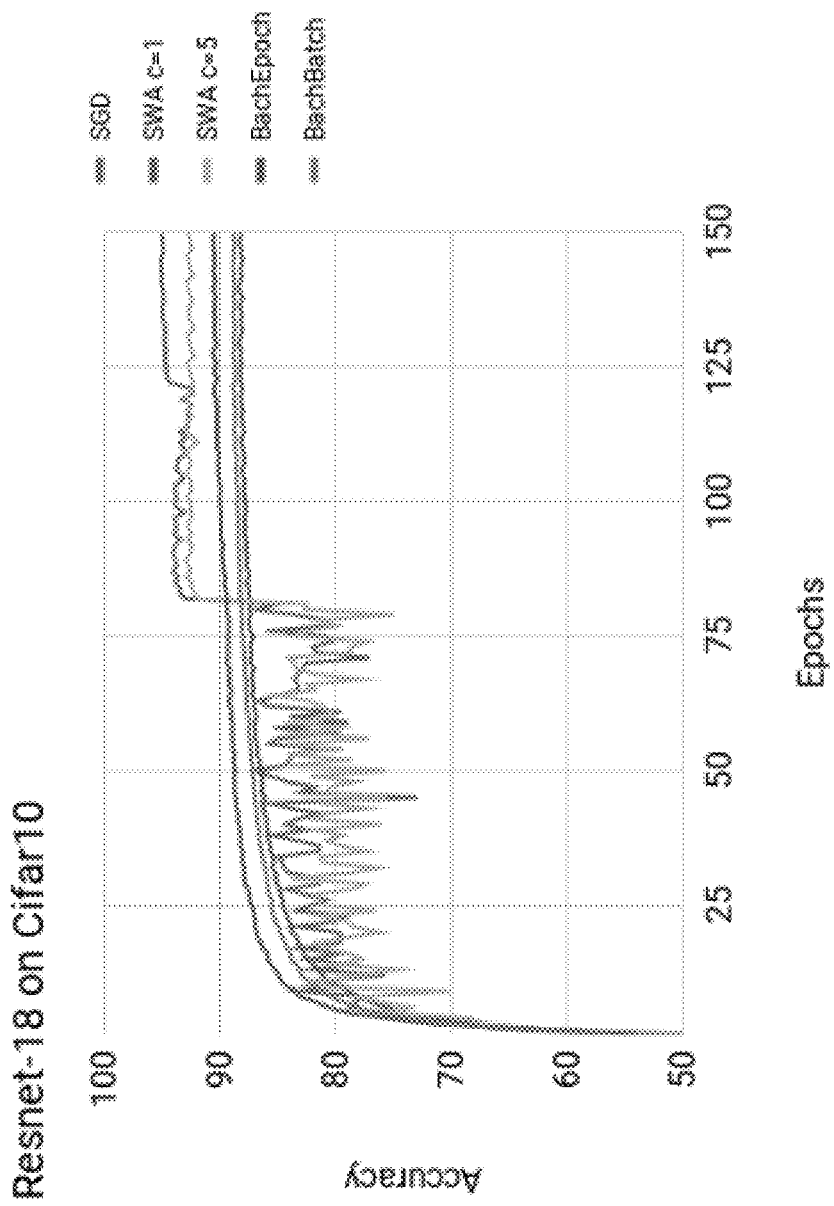
FIG. 3 is a diagram illustrating performances of various algorithms with stochastic gradient descent in accordance with some implementations.

FIG. 3 is a diagram illustrating performance of various algorithms with stochastic gradient descent in accordance with some implementations. In some implementations, some methods extend a Polyak Ruppert Averaging (PRA) method to use model weight distribution to achieve improvements on either the training process or a trained model. The PRA is a well-known optimal algorithm that is similar to SGD but is based on the idea of averaging the trajectories. Generally, PRA consists of averaging several points in the parameter space that an optimization algorithm traverses through to stabilize training procedures during backpropagation. However, these PRA based methods fail to produce adequate performances when the PRA based methods are directly applied to train a DNN from scratch. In addition, weight averaging based approaches also increase the computational load leading to increased training time.

In some implementations, a Stochastic Weight Averaging (SWA) method uses the PRA method over a model distribution when retraining pretrained models to achieve flatter minimas and better generalization. The SWA method is another well-known optimization algorithm that improves generalization in deep learning over SGD. First, the SWA uses a modified learning rate schedule such that SGD continues to explore the set of high-performing networks instead of simply converging to a single solution. As an example, SWA uses the standard decaying learning rate strategy for the first 75% of training time, and then sets the learning rate to a reasonably high constant value for the remaining 25% of the time. Second, the SWA averages the weights of the network traversed by SGD. For example, SWA maintains a running average of the weights obtained in the end of every minibatch of training data within the last 25% of training time. The SWA technique provides a better generalization when finetuning a model.

FIG. 3 shows the performance of a modified SWA method used to train a neural network model from scratch and variations of the modified SWA method on ResNet18 on Cifar10. ResNet18 is a well-known convolutional neural network that is trained on more than a million images from the ImageNet database. The ResNet18 network is 18 layers deep and can classify images into 1000 object categories such as keyboard, mouse, pencil, and animals. The Cifar10 dataset is a well-known dataset that consists of a collection of images that are commonly used to train machine learning and computer vision algorithms. Specifically, the Cifar10 dataset contains 60,000 32×32 color images in 10 different classes that represent airplanes, cars, birds, cats, deer, dogs, frogs, horses, ships, and trucks. The Cifar10 database can be used to teach a computer how to recognize objects. Cifar10 is particularly well suited to allow researchers to quickly try different algorithms to see what works because the images in Cifar10 are low-resolution (32×32).

In some implementations, the modified SWA method initialized a running mean for all model parameters and after training it for 'c' minibatches of training data ('c' is a predefined hyperparameter), the modified SWA method replaced the model weights with their respective running means. As such, the modified SWA method only initializes the running mean once. The running mean is then kept updated and reassigned after 'c' minibatches of training data—which is consistent with the previous SWA algorithm. Similarly, the modified SWA method also calibrated batch normalization (BN) layers for both approaches by performing a forward pass over the training data after each reassignment. FIG. 3 shows the performance of the modified SWA technique where c equals 1 and the performance of the modified SWA technique when c equal 5.

FIG. 3 also shows the performance of an averaging technique for the projected stochastic subgradient method where an iteration-based weighed averaging approach to model training and variations of the averaging technique on ResNet 18 on Cifar10 with weighted averaging. In some implementations, the averaging technique initializes a running weight for each model parameter.

In the first approach (BachEpoch), the averaging technique updates the mean estimation after each epoch (or minibatch of training data), multiplied by the epoch value (as the averaging technique performs weighed averaging) and then reassigns the mean value to those weights. The first approach provides a linear weighed averaging approach.

In the second approach (BachBatch), the averaging technique updates the mean estimation after each batch, multiplied by ((epoch−1)×n)+t, and reassigns model weights at the end of the epoch (n being the total number of batches in the epoch and t being the current batch). The second approach provides an exponential weighed averaging approach.

ResNet 18 over Cifar10 is trained for 150 epochs (or 150 minibatches of training data) and uses SGD with momentum of 0.9, L2 penalty of 0.0005, and has a learning rate schedule which decreases by a factor of 10 at epochs 80, 120, 150. While these figures show the progress of inaccuracy over a number of epochs, the invention is not limited to 150 epochs. Instead, the invention can be used over any arbitrary number of minibatches.

As seen in FIG. 3, both the modified SWA method, BachEpoch, and BachBatch methods cannot replicate the accuracy achieved by SGD. When using the modified SWA technique, those approaches deteriorate performance and hinder convergence. The performance improvements with higher values of 'c' in the modified SWA technique is due to fewer reassignments of the modified SWA technique. In the averaging technique of using weighed averaging with greater significance to later epochs in a linear (BachEpoch) and exponential (BachBatch) fashion also fail to optimally converge.

Moreover, all approaches add an increased computational load in processing of PRA for each model parameter while training, reassignment of the computed values, followed by recalibration of BN layers. These computation loads add up because all here tasks are performed for each epoch (or minibatch of training data) while training. Hence, the modified SWA technique, the BachEpoch, and BachBatch approaches may work well for improving generalization of pretrained neural networks and optimizing convex learning models. However, when the modified SWA technique, the BachEpoch, and BachBatch approaches are used for DNN training, the modified SWA technique, the BachEpoch, and BachBatch increase the computational load and training time without providing state-of-the-art convergence.

A deeper analysis of the modified SWA technique, the BachEpoch, and BachBatch approaches show that both SWA and weighed averaging methods provide better generalization at the early stages of the training process, typically in the underfitting regime. However, as the mean is biased by the model weights at the early stages of the training process, it cannot converge properly at the alter stages of the training, even when one allows weighted averaging in favor of models at later stages.

The trio of techniques (PSWA, PWALKS, and PSWM) address this problem by removing the dependency of any prior weight distribution estimations for the general PRA approach. The presented techniques center around periodic sampling of model weights that provide consistent and more robust convergence on a variety of vision problems (e.g., classification, detection, segmentation, or the like) and gradient update methods (vanilla SGD, Momentum, ADAM) with marginal additional computation time are introduced. These techniques converge in a less volatile fashion with performance improvements that are approximately monotonic. The analysis of the loss surface also show that these techniques also produce minima that are deeper and wider than those found by SGD.

The techniques all share a common theme in manipulating the model weights directly using their distribution over batchwise updates to achieve significant improvements in training convergence and add more robustness to the optimization process with negligible cost of additional training time. As will be explained in greater detail below in FIG. 4, the PSWA method samples a percentage k % of the weights and averages the samples of the weights instead of using all of the weights. As will also be explained in greater detail below in FIG. 7, the PWALKS method samples the last few k % to perform a main average. As will be explained in greater detail below in FIG. 9, the PSWM method treats all weights equally, but gives greater weight to the more recent batches and less weight to the older batches. The techniques remain independent of gradient optimization methods because the techniques modify the model weights directly using their distribution over gradient updates.

Figure 4:
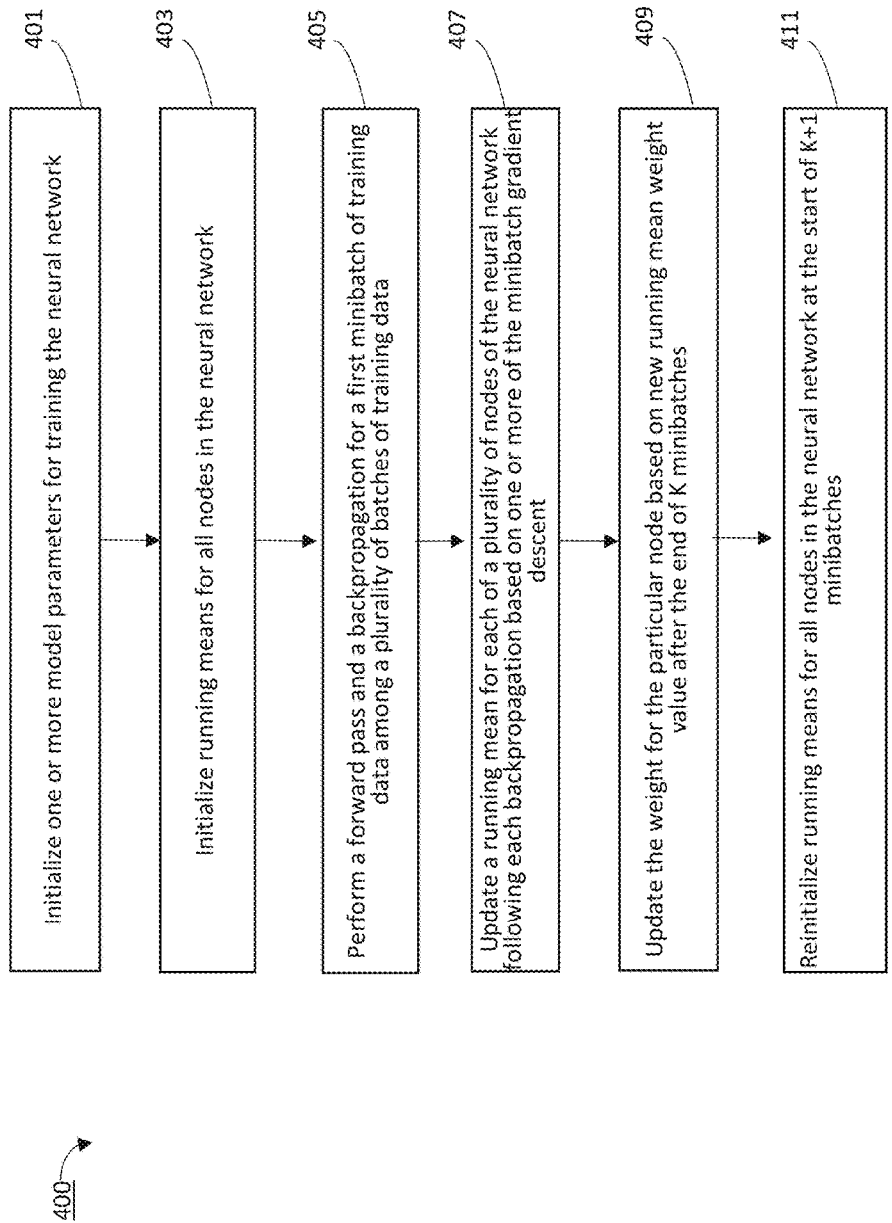
FIG. 4 is a flowchart representation of a Periodically Sampled Weight Averaging (PSWA) method in accordance with some implementations.

FIG. 4 is a flowchart representation of a Periodically Sampled Weight Averaging (PSWA) in accordance with some implementations. In some implementations, the PSWA method 400 is performed by a device with one or more processors and non-transitory memory such as one of the AI devices 110 shown in FIG. 1 or the edge device 200 shown in FIG. 2. In some implementations, the PSWA method 400 is implemented as a set of computer readable instructions that are executed at a device. Briefly, the PSWA method 400 includes sampling the model weights over the batchwise updates and repeating the sampling periodically over minibatches of training data. In some implementations, epochs (or K numbers of minibatches) are a hyperparameter that define the number of times that a learning algorithm will work through the entire dataset. In other words, a minibatch may be an arbitrary number of batches (otherwise represented by K) of training data depending on requirements of computing power such that K represents the number of minibatches in an epoch. In other words, a minibatch of training data corresponds to the number of complete passes through a training dataset.

A challenge for applying general weight averaging techniques for DNN models is the added computational load, which leads to longer training times. The time complexity of model training with weight averaging typically contains three parts: $T_{total} = T_{backprop} + \alpha T_{weight\ update} + \beta T_{Calibrate\ BN}$, where $T_{backprop}$, $T_{weight\ update}$, $T_{Calibrate\ BN}$, mark the time spend on back-propagation, recalibration, and weight sampling using the full training dataset. Using a plain PSWA for the same number of minibatches of training data will lead to a longer training time.

To remedy this additional computational load, the PSWA method 400 improves the plain PSWA such that the PSWA method 400 updates the running mean for only a few percent (α) of the batches spread evenly over the randomized training data. Similarly, the PSWA method 400 calibrates the global mean and variance of each BN layer with β percent of the training data using a fast forward pass.

To that end, as represented by block 401, in some implementations, the PSWA method 400 includes initializing one or more model parameters for training the neural network.

As represented by block 403, the PSWA method 400 includes initializing running means for all nodes in the neural network.

As represented by block 405, the PSWA method 400 includes performing a forward pass and backpropagation for a minibatch of training data among a plurality of batches of training data.

As represented by block 407, the PSWA method 400 includes updating a running mean for each of a plurality of nodes of the neural network following each backpropagation based on one or more of the minibatch gradient descent.

As represented by block 409, the PSWA method 400 includes updating the weight for the particular node based on new running mean weight value after the end of K minibatches. In some implementations, K represents the number of minibatches in an epoch. In some implementations, K may be a number from 1 to 100.

As represented by block 411, the PSWA method 400 reinitializing running means for all nodes in the neural network at the start of K+1 minibatch. In the reinitialization step, the PSWA method 400 does not take in to account the weights from the previous epochs.

In some implementations, the PSWA method 400 may be represented by Algorithm 1. In some implementations, Algorithm 1 presents the general workflow of the PSWA method 400 for training a DNN.

---

Algorithm 1 Periodically Sampled Weight Averaging

---

1: procedure PSWA
Require:
    Initialize DNN model $w^{(0)}$
    Initialize Learning rate schedule $\eta(e)$
    Initialize training data batches $D_1 \ldots D_b$
    Initialize total epochs epochs
    Initialize running mean $\hat{w}$ for $w^{(0)}$ parameters
    Determine sampling strategy and $\alpha, \beta$
Ensure:
2:    for e in 1 ... epochs do
3:      randomize($D_1 \ldots D_b$)
4:      reset ($\hat{w}$, 0)
5:      for i in 1 ... b do
6:        $w^{(i)} = w^{(i-1)} - \eta \nabla_w(w^{(i)}, D_i)$
7:        update ($\hat{w}$, $w^{(i)}$, i, α)
8:      $w^{(e)}$ . assign($\hat{w}$)
9:      BN recalibration (β)

---

After initializing the model parameters and data for training, the PSWA method 400 may repeatedly update the model weights by SGD or other gradient-based optimizations. Then, the PSWA method 400 updates the mean estimation of each weight. The update is carried out in an streaming fashion. For α=100% where we use the full dataset, it is:

$$\hat{w} \leftarrow \frac{i-1}{i}\hat{w} + \frac{w^{(i)}}{i}$$

To reduce the computational time, the PSWA method 400 selects α percent of batches to be used for mean estimation, and the PSWA method 400 changes the count i correspondingly. In some implementations, the PSWA method 400 will rest the $\hat{w}$ to 0 before starting each minibatch of training data, and the PSWA method 400 will reassign the mean weights to model weights after the minibatch of training data is completed. After reassignment, the BN layers are not best suitable for the new set of weights, so the PSWA method 400 recalibrates the BN layers using β percent of the training data to perform a forward pass and recompute global mean and variance statistics for each BN layer.

Although PSWA method 400 has been implemented to train neural networks, one of ordinary skill in the art will appreciate that the PSWA method 400 may also be applicable to any other machine learning algorithm that uses gradient descent such as decision trees, support vector machines, support vector networks, or machine learning algorithms that use a forward and back propagation.

Figure 5:
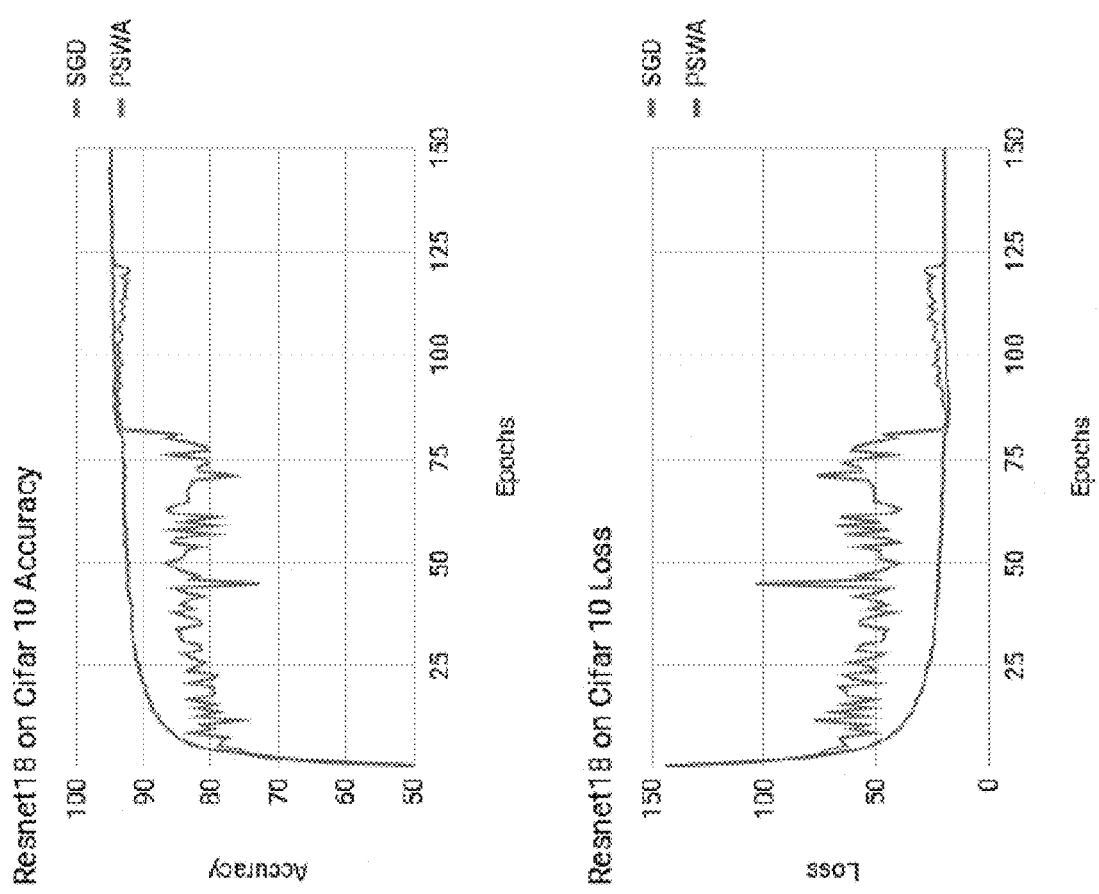
FIG. 5 is a diagram illustrating performance results from an application of PSWA for ResNet18 on Cifar10 with SGD in accordance with some implementations.

FIG. 5 is a diagram illustrating the application of PSWA for ResNet18 on Cifar10 with SGD in accordance with some implementations.

The PSWA approach allows the neural network model to train effectively for one minibatch of training data, while keeping running means for all model parameters over the weight distribution after batchwise gradient updates, followed by reassigning the running mean to the parameter weights, and then reinitializing the mean at the end of the minibatch of training data. This additional step allows for SGD to gradually converge the model to the optimum by making gradient updates. Meanwhile, averaging over the batchwise distribution provides for a stabling effect on the model.

Figure 6:
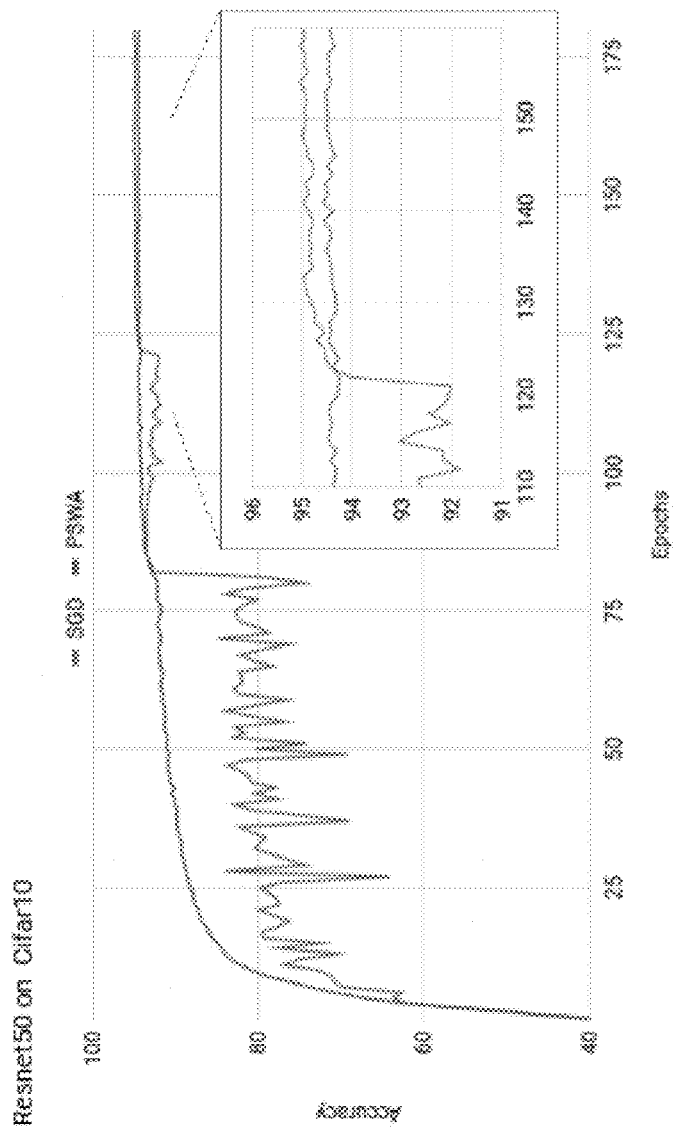
FIG. 6 is a diagram illustrating effects from an application of PSWA on ResNet50 with SGD in accordance with some implementations.

Although the PSWA method 400 achieves optimal final test accuracy using shallow ResNet18 model and other lightweight models, the PSWA method 400 still does not converge properly to the optimum for deeper networks such as ResNet50. FIG. 6 shows the effect on ResNet50. ResNet50 is a well-known convolutional network that is trained on more than a million images from the ImageNet database. Specifically, the ResNet50 network is 50 layers deep and can classify images into 1000 object categories such as keyboard, mouse, pencil, and many animals. As a result, the ResNet50 network has learned rich feature representations for a wide range of images. The ResNet50 has an image size of 224 by 224.

FIG. 6 is a diagram illustrating the application of PSWA on ResNet50 with SGD in accordance with some implementations. This problem is also pervasive across similar deep networks like Inception (a well-known neural network for visual object recognition) and DenseNet (another well-known neural network for visual object recognition), and also on datasets like ImageNet (a large visual database designed for use in visual object recognition software research). However, it is important to note that the learning rate schedule decreases by a factor of 10 at the $80^{th}$ minibatch of training data and $120^{th}$ minibatch of training data, and that it is after the $120^{th}$ minibatch of training data that the SGD method converges to a better result than the PSWA method 400.

The suboptimal convergence problem for deeper networks may be solved with two different modifications to the PSWA method 400. The first modification is called a Periodic Weight Averaging over Last K Samples (PWALKS) approach (described in greater detail in the PWALKS method 700 shown in FIG. 7) and the second modification is called a Periodically Sampled Weight Momentum (PSWM) approach (described in greater detail in the PSWM method 900 shown in FIG. 9). As will be shown below, both the PWALKS method 700 and PSWM method 900 approaches allocate more importance to the model weights during the final batches while also still maintaining the regularization afforded by using the weight distribution.

Figure 7:
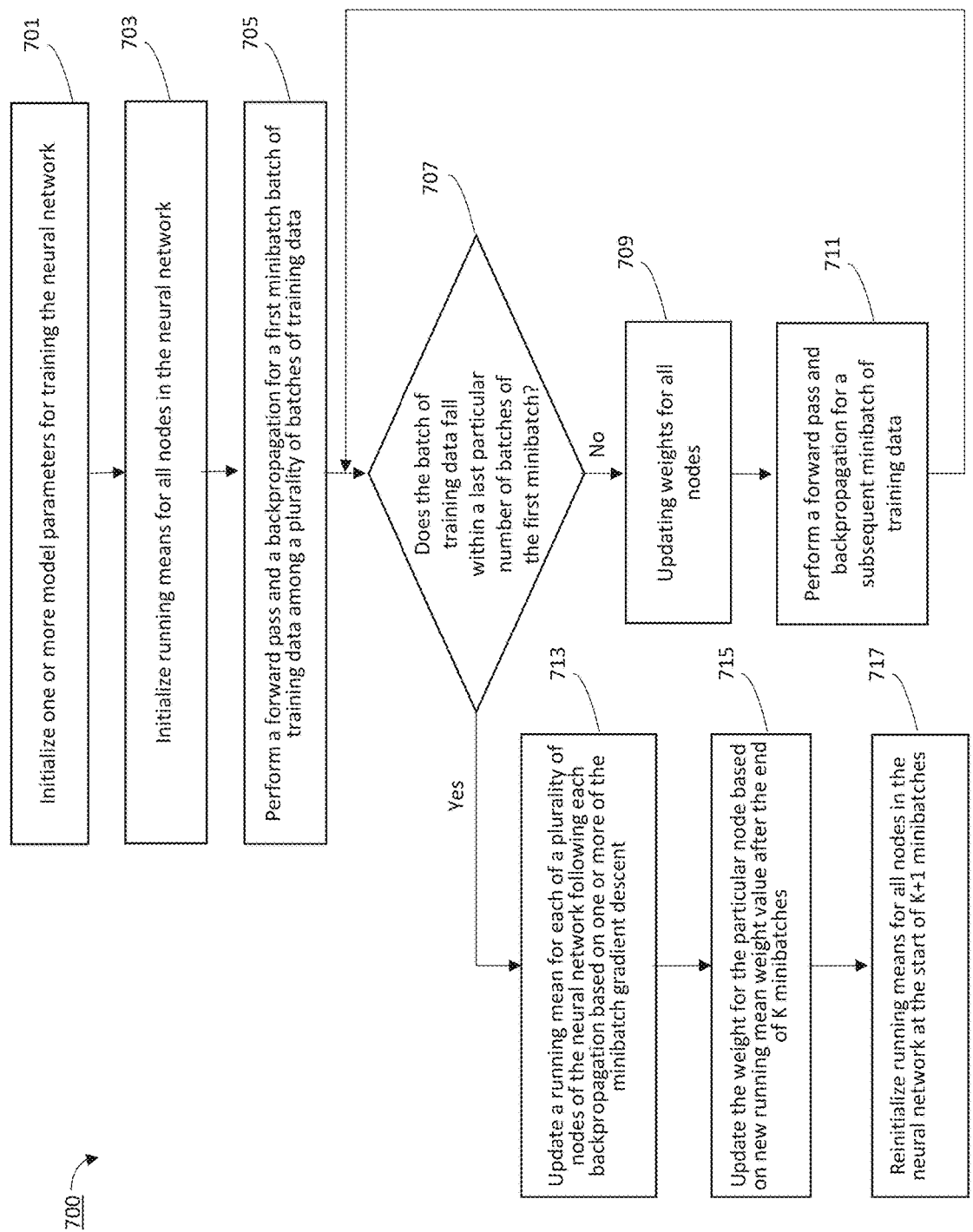
FIG. 7 is a flowchart representation of a Periodic Weight Averaging over Last K Samples (PWALKS) method in accordance with some implementations.

FIG. 7 is a flowchart representation of a Periodic Weight Averaging over Last K Samples (PWALKS) method in accordance with some implementations. In some implementations, the PWALKS method 700 is performed by a device with one or more processors and non-transitory memory such as the AI devices 110 shown in FIG. 1 or the edge device 200 shown in FIG. 2. In some implementations, the PWALKS method 700 is implemented as a set of computer readable instructions that are executed at a device.

A first approach to solve the PSWA convergence problem is the PWALKS method 700. The PWALKS method 700 differs from the PSWA method 400 (the PSWA method 400 shown in FIG. 4) because instead of sampling weights evenly from all batches for the mean distribution (e.g., such as in the PSWA method 400), the PWALKS method 700 only samples the last 'k' % of the samples at each minibatch of training data. As such, the PWALKS method 700 is based on the principal that averaging is most beneficial towards the batch at the end. In some implementations, 'k' is a hyperparameter of a size of the dataset and batches and ranges between 0 (last batch only, standard SGD) and 100 (PSWA with α=1).

To that end, as represented by block 701, in some implementations, the PWALKS method 700 includes initializing one or more model parameters for training the neural network.

As represented by block 703, the PWALKS method 700 includes initializing running means for all nodes in the neural network.

As represented by block 705, the PWALKS method 700 includes performing a forward pass and backpropagation for each batch of training data among a plurality of batches corresponding to each epoch.

As represented by block 707, the PWALKS method 700 includes determining whether the batch of training data fall within a particular number of batches of the first minibatch. If the determination is a yes, then, as represented by block 713, the PWALKS method 700 includes updating a running mean for each of a plurality of nodes of the neural network following each backpropagation based on one or more of the minibatch gradient descent. As represented by block 715, the PWALKS method 700 includes updating the weight for the particular node based on new running mean weight value after the end of K minibatches. In some implementations, K represents the number of minibatches in an epoch. In some implementations, K may be a number from 1 to 100. As represented by block 717, the PWALKS method 700 includes reinitializing running means for all nodes in the neural network at the start of K+1 minibatches.

If the determination from block 707 is a no, then, as represented by block 709, the PWALKs method 700 includes updating weights for all nodes. As represented by block 711, the PWALKS method 700 includes performing a forward pass and backpropagation for a subsequent minibatch of training data. Following the step in block 711, the PWALKS method 700 loops back to determining whether the batch of training data fall within a particular number of batches of the first minibatch, as represented by block 707.

In some implementations, the PWALKS method 700 may be represented by Algorithm 1 shown above, but with a tweak to the algorithm. To convert the PSWA method 400 to the PWALKS method 700, the update (line 7) of Algorithm 1 is applied only when I<b×(1−k %) and the parameter k is equivalent to α in the PSWA method 400 in terms of controlling computation cost.

| Algorithm 1 Periodically Sampled Weight Averaging |
|---|
| 1: procedure PSWA<br>Require:<br>    Initialize DNN model $w^{(0)}$<br>    Initialize Learning rate schedule $\eta(e)$<br>    Initialize training data batches $D_1 \ldots D_b$<br>    Initialize total epochs epochs<br>    Initialize running mean $\hat{w}$ for $w^{(0)}$ parameters<br>    Determine sampling strategy and $\alpha,\beta$<br>Ensure:<br>  2:    for e in 1 ... epochs do<br>  3:        randomize($D_1 \ldots D_b$)<br>  4:        reset ($\hat{w}$, 0)<br>  5:        for i in 1 ... b do<br>  6:            $w^{(i)} = w^{(i-1)} - \eta\nabla_w(w^{(i)}, D_i)$<br>  7:            update ($\hat{w}$, $w^{(i)}$, i, $\alpha$)<br>  8:        $w^{(e)}$ . assign($\hat{w}$)<br>  9:        BN recalibration ($\beta$) |

Although PWALKS method 700 has been implemented to train neural networks, one of ordinary skill in the art will appreciate that the PWALKs method 700 may also be applicable to any other machine learning algorithm that uses gradient descent such as decision trees, support vector machines, support vector networks, or machine learning algorithms that use a forward and back propagation.

Figure 8:
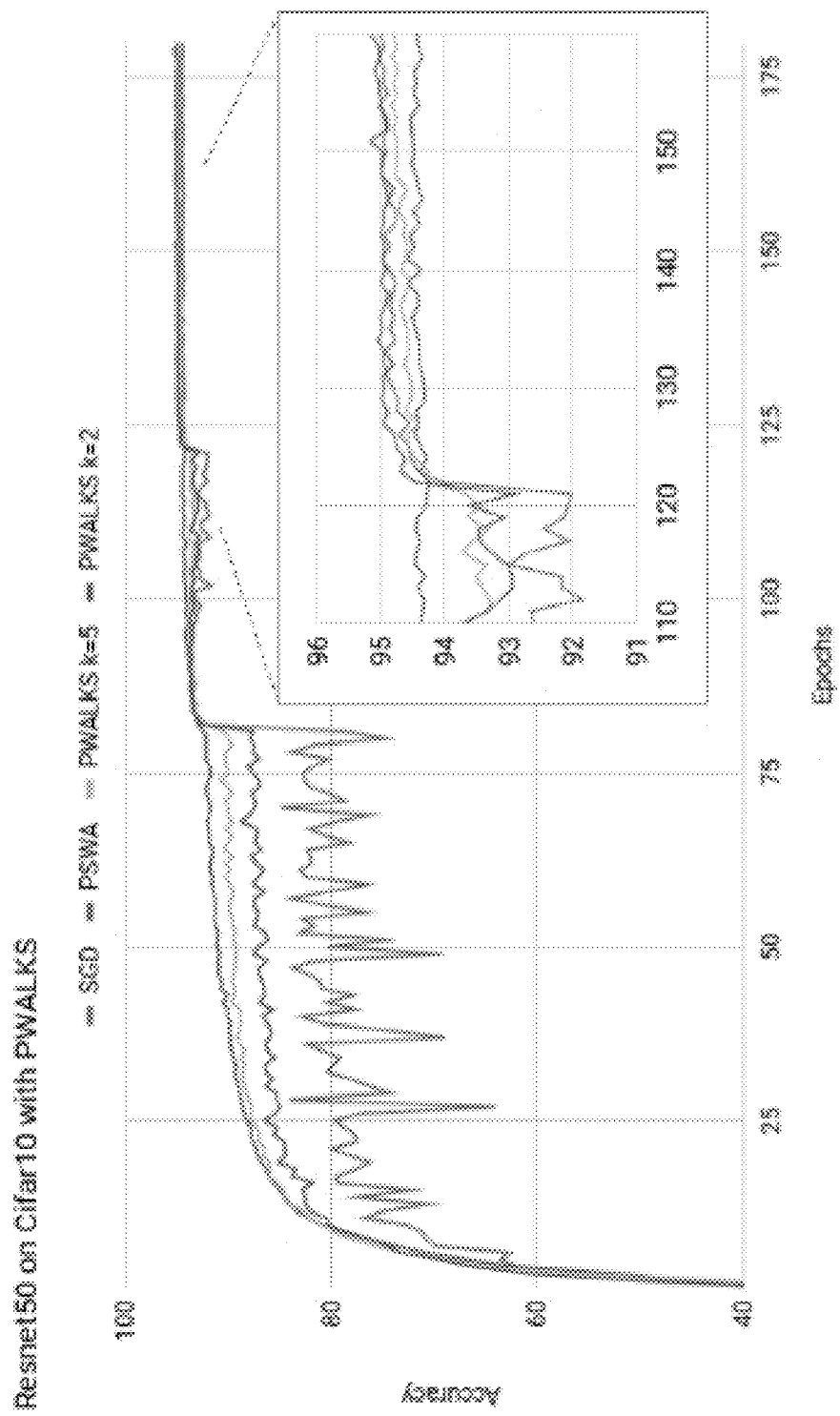
FIG. 8 is a diagram illustrating the application of PWALKS for ResNet50 with PSWA and SGD in accordance with some implementations.

FIG. 8 is a diagram illustrating the application of PWALKS for ResNet50 with PSWA and SGD in accordance with some implementations.

As shown in FIG. 8, a small k value between 2-5% provides consistently good performance by providing improvement over plain SGD during early training (though not as much as PSWA) and consistency converges to the optimum as shown in FIG. 8.

Figure 9:
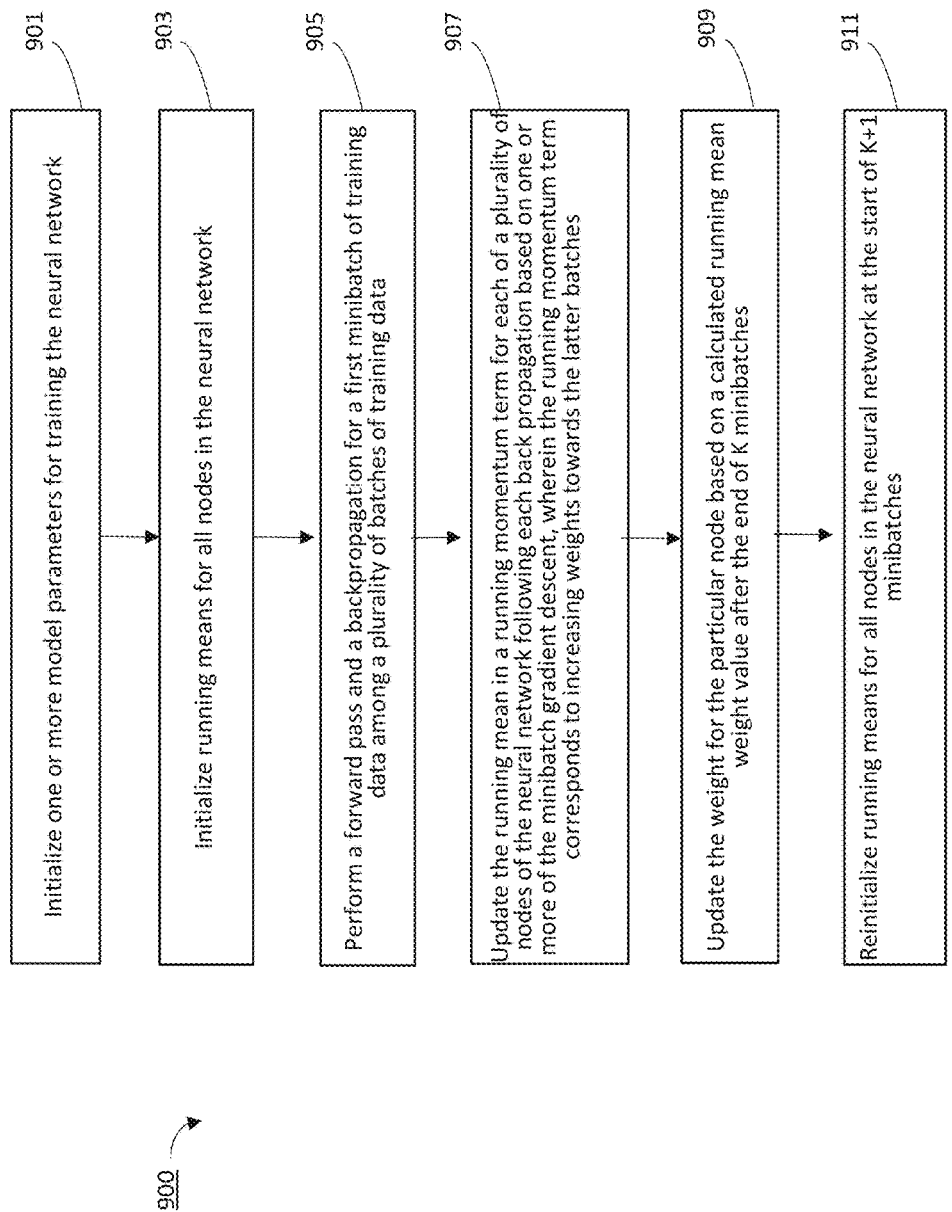
FIG. 9 is a flowchart representation of a Periodically Sampled Weight Momentum (PSWM) in accordance with some implementations.

FIG. 9 is a flowchart representation of a Periodically Sampled Weight Momentum (PSWM) in accordance with some implementations. In some implementations, the PSWM method 900 is performed by a device with one or more processors and non-transitory memory such as the AI devices 110 shown in FIG. 1 or the edge device 200 shown in FIG. 2. In some implementations, the PSWM method 900 is implemented as a set of computer readable instructions that are executed at a device.

A second approach to solving the PSWA convergence problem is the PSWM method 900. The PSWM method 900 approaches the PSWA convergence problem from the perspective of a cumulative adjustment rather than weights (such as PSWA method 400 shown in FIG. 4 or the PWALKS method 700 shown in FIG. 7). PSWM method 900 is built on the PSWA method 400 so the sampling technique developed for the PSWA method 400 can be applied to also reduce the time complexity of the PSWM method 900. Unlike the PSWA method 400 of keeping a running mean, the PSWM method 900 keeps the running weights updated using a momentum. For the model's parameters, the PSWM method 900 keeps a running momentum term, which the PSWM method 900 updates at the end of each batch and reassign as the end of the minibatch of training data. In some implementations, the running momentum term is updated after each batch such that new weight values for calculating the new weighted means are increasingly weighted toward an end of the first minibatch of training data.

To that end, as represented by block 901, in some implementations, the PSWM method 900 includes initializing one or more model parameters for training the neural network.

As represented by block 903, the PSWM method 900 includes initializing running means for all nodes in the neural network.

As represented by block 905, the PSWM method 900 includes performing a forward pass and back propagation for a first minibatch of training data among a plurality of batches of training data.

As represented by block 907, the PSWM method 900 includes updating the running mean in a running momentum term for each of a plurality of nodes of the neural network following each back propagation based on one or more of the minibatch gradient descent, wherein the running momentum term corresponds to increasing weights toward the latter batches.

As represented by block 909, the PSWM method 900 includes updating the weight for the particular node based on a calculated running mean weight value after the end of the K minibatches. In some implementations, K represents the number of minibatches in an epoch. In some implementations, K may be a number from 1 to 100.

As represented by block 911, the PSWM method 900 includes reinitializing running means for all nodes in the neural network at the start of K+1 minibatches.

In some implementations, the PSWM method 900 further includes assigning the weighted means as the weight for the particular node when training on the first minibatch of training data is completed. In some implementations, the PSWM method 900 further includes reinitializing the weighted mean for the particular node for performing training on a second minibatch of training data.

In some implementations, the PSWM method 900 may be represented by Algorithm 1, but with a tweak in the algorithm. To convert the PSWA method 400 to the PSWM method 900, the update value (line 7) of Algorithm 1 is changed to:

$$\hat{w} \leftarrow (1-m) \times \frac{i-1}{i} \hat{w} + m \times \frac{w^{(i)}}{i}.$$

---

Algorithm 1 Periodically Sampled Weight Averaging

---

1: procedure PSWA
Require:
    Initialize DNN model $w^{(0)}$
    Initialize Learning rate schedule $\eta(e)$
    Initialize training data batches $D_1 \ldots D_b$
    Initialize total epochs epochs
    Initialize running mean $\hat{w}$ for $w^{(0)}$ parameters
    Determine sampling strategy and $\alpha, \beta$
Ensure:
2:  for e in 1 ... epochs do
3:    randomize($D_1 \ldots D_b$)
4:    reset ($\hat{w}$, 0)
5:    for i in 1 ... b do
6:      $w^{(i)} = w^{(i-1)} - \eta \nabla_w(w^{(i)}, D_i)$
7:      update ($\hat{w}$, $w^{(i)}$, i, $\alpha$)
8:    $w^{(e)}$. assign($\hat{w}$)
9:    BN recalibration ($\beta$)

---

Although PSWM method 900 has been implemented to train neural networks, one of ordinary skill in the art will appreciate that the PSWM method 900 may also be applicable to any other machine learning algorithm that uses gradient descent such as decision trees, support vector machines, support vector networks, or machine learning algorithms that use a forward and back propagation.

Figure 10:
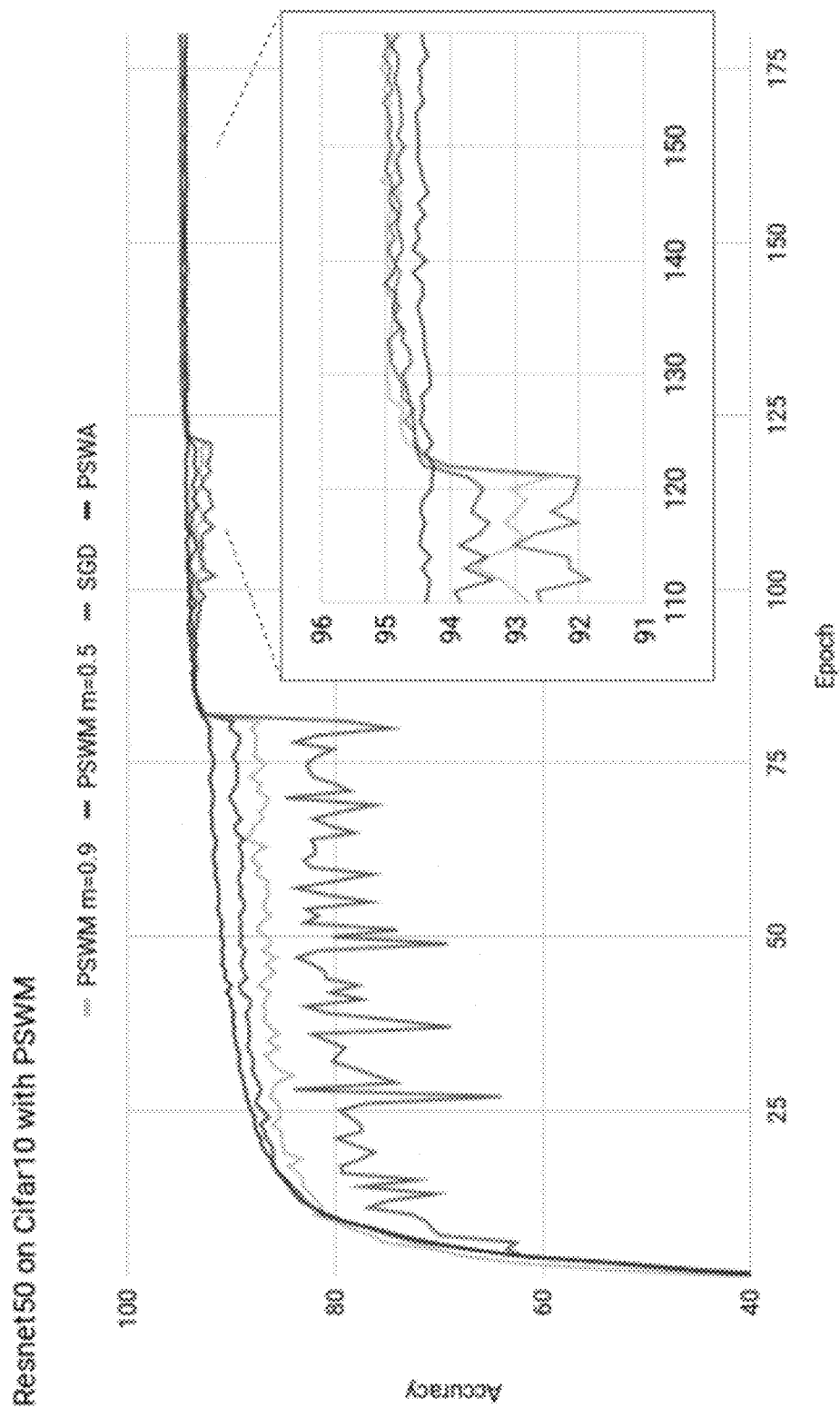
FIG. 10 is a diagram illustrating the application of PSWM for ResNet50 with PSWM and SGD in accordance with some implementations.

FIG. 10 is a diagram illustrating the application of PSWM for ResNet50 on Cifar10 with PSWM and SGD in accordance with some implementations.

Here, ResNet50 is trained for 180 minibatches of training data and uses SGD with a momentum of 0.9, L2 penalty of 0.0005, and has a learning rate schedule which decreases by factor of 10 at minibatches 80, 120, and 150. As shown in FIG. 10, momentum values between (0.5, 0.9) yield good performance with m=1 being standard SGD.

Figure 11:
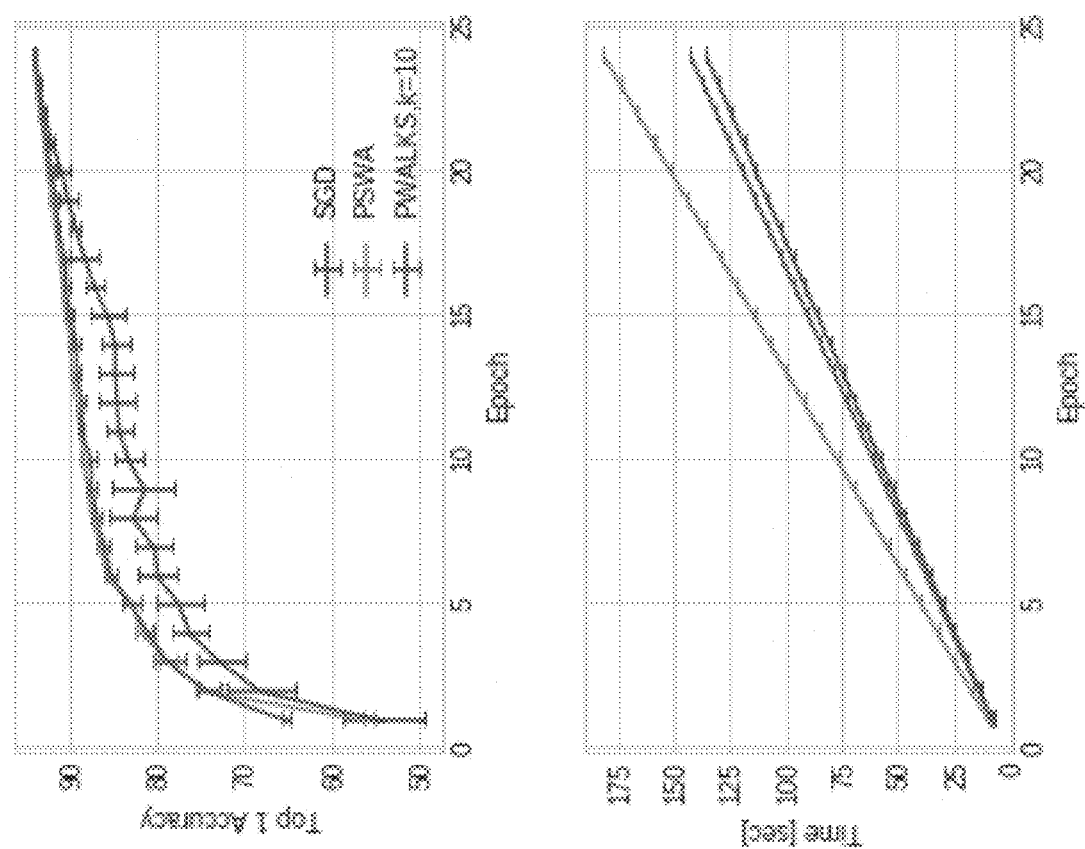
FIG. 11 is a diagram illustrating a comparison of computation time for plain-vanilla SGD, PSWA, and PWALKS in accordance with some implementations.

FIG. 11 is a diagram illustrating a comparison of computation time for plain-vanilla SGD, PSWA, and PWALKS in accordance with some implementations.

FIG. 11 depicts the computational performances of plain-vanilla SGD, PSWA with $\alpha=\beta=1$ and PWALKS with k=10 and $\beta=10\%$. The results in FIG. 11 are from a code based on the fastest Cifar10 training code listed in the DAWN project and the original implementation is changed from half-precision to full precision. The DAWN project is a well-known benchmark suite for end-to-end deep learning training and inference. The DAWN project provides a reference set of common deep learning workloads for quantifying training time, training cost, inference latency, and inference cost across different optimization strategies, model architectures, software frameworks, clouds, and hardware. The training process was repeated ten times for each technique and the corresponding mean and standard deviations were reported.

FIG. 11 shows that the PSWA method 400 leads to a 34% overhead when using the full training dataset for weight update and recalibration of BN layers; and by adopting the PWALKS method 700, the same prediction accuracy on the testing dataset can be achieved without sacrificing the speed significantly without code-level optimizations. In addition, FIG. 11 reveals that the variations of the training process are much smaller when weight averaging techniques have been applied.

FIGS. 12-17B show that the PSWA, PWALKS, and PSWM techniques can be effectively applied on various computer vision tasks such as classification, detection, segmentation across different convolutional neural network architectures such as ResNet18, ResNet50, DenseNet121, Inception, MobileNet trained using a variety of optimization techniques such as SGD, momentum, ADAM (a well-known adaptive learning rate optimization algorithm that has been designed specifically for training deep neural networks) and other diverse learning rate schedules. The PSWA method 400, the PWALKS method 700, and the PSWM method 900 techniques also consistently provide increased stability and consistent improvements on intermediate performance while converging optimally over a broad spectrum of hyperparameter values. The PSWA method 400, the PWALKS method 700, and the PSWM method 900 techniques are compared against SGD-based approaches as a baseline because SGD-based approaches provide state-of-the-art performance.

In the presented examples shown in FIGS. 12-17B, the optimizer, learning rate (and its learning rate schedule), and training hyperparameters have all been finetuned for convergence in the original implementations. The original implementations were not modified when training using the PSWA method 400, the PWALKS method 700, and the PSWM method 900 techniques to ensure fair comparisons. For most machine learning applications, the optimal hyperparameters and learning rate schedules are unknown. The hyperparameters and learning rate schedules can introduce volatility in the training process and uncertainty regarding the final convergence. For both of these scenarios, The PSWA method 400, the PWALKS method 700, and the PSWM method 900 techniques can provide improvements in stability and performance. Moreover, the PSWA method 400, the PWALKS method 700, and the PSWM method 900 techniques may be constrained by computation resources or training time—which results in training for a short timer and at high learning rates. In such scenarios, the PSWA method 400, the PWALKS method 700, and the PSWM method 900 techniques can provide consistently better generalization and higher expected accuracy at intermediate minibatches of training data and early minibatches as will be presented in FIG. 19C.

Figure 12:
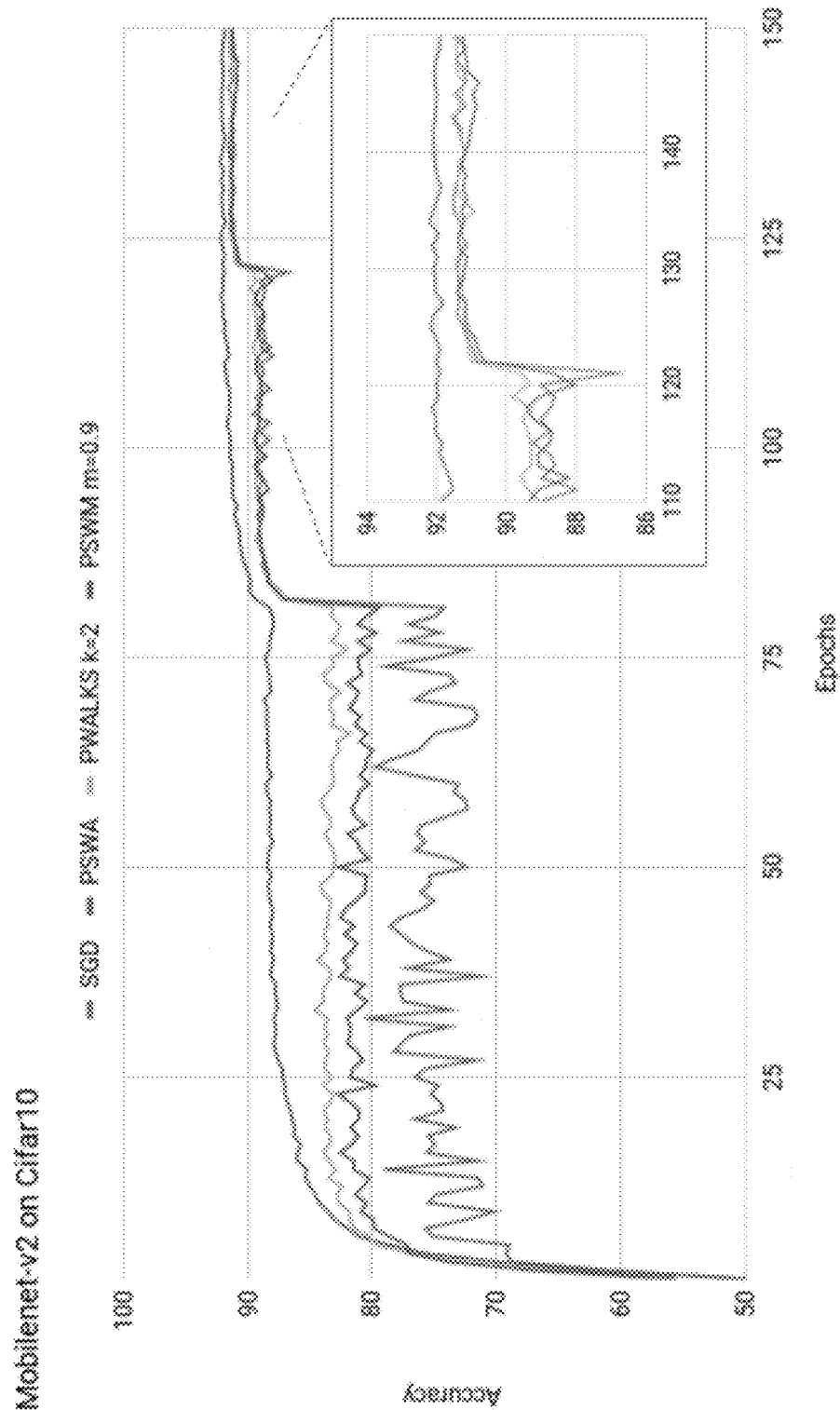
FIG. 12 is a diagram illustrating PSWA, PWALKS, and PSWM on a shallow network in accordance with some implementations.

FIG. 12 is a diagram illustrating PSWA, PWALKS, and PSWM on a shallow network in accordance with some implementations.

FIG. 12 shows that on experiments on shallow networks like MobileNetV2 and ResNet18, PSWA provides not only faster and more robust convergence, but also converges to a more optimal minima as compared to shallow networks like MobileNetV2 and ResNet18. MobileNetV2 is a well-known mobile architecture that improves the state of the art performance of mobile models on multiple tasks and benchmarks as well as across a spectrum of different model sizes. MobileNetV2 builds on MobileNetV1 which is a family of general purpose computer vision neural networks designed with mobile devices in mind to support classification, detection, and more.

FIG. 12 also shows that between the PWALKs method 700 and the PSWM method 900 with the PSWA method 400 on shallow networks—the PSWA method 400 converges to deeper minima, whereas the PWALKs method 700 and the PSWM method 900 are both unable to.

Figure 13:
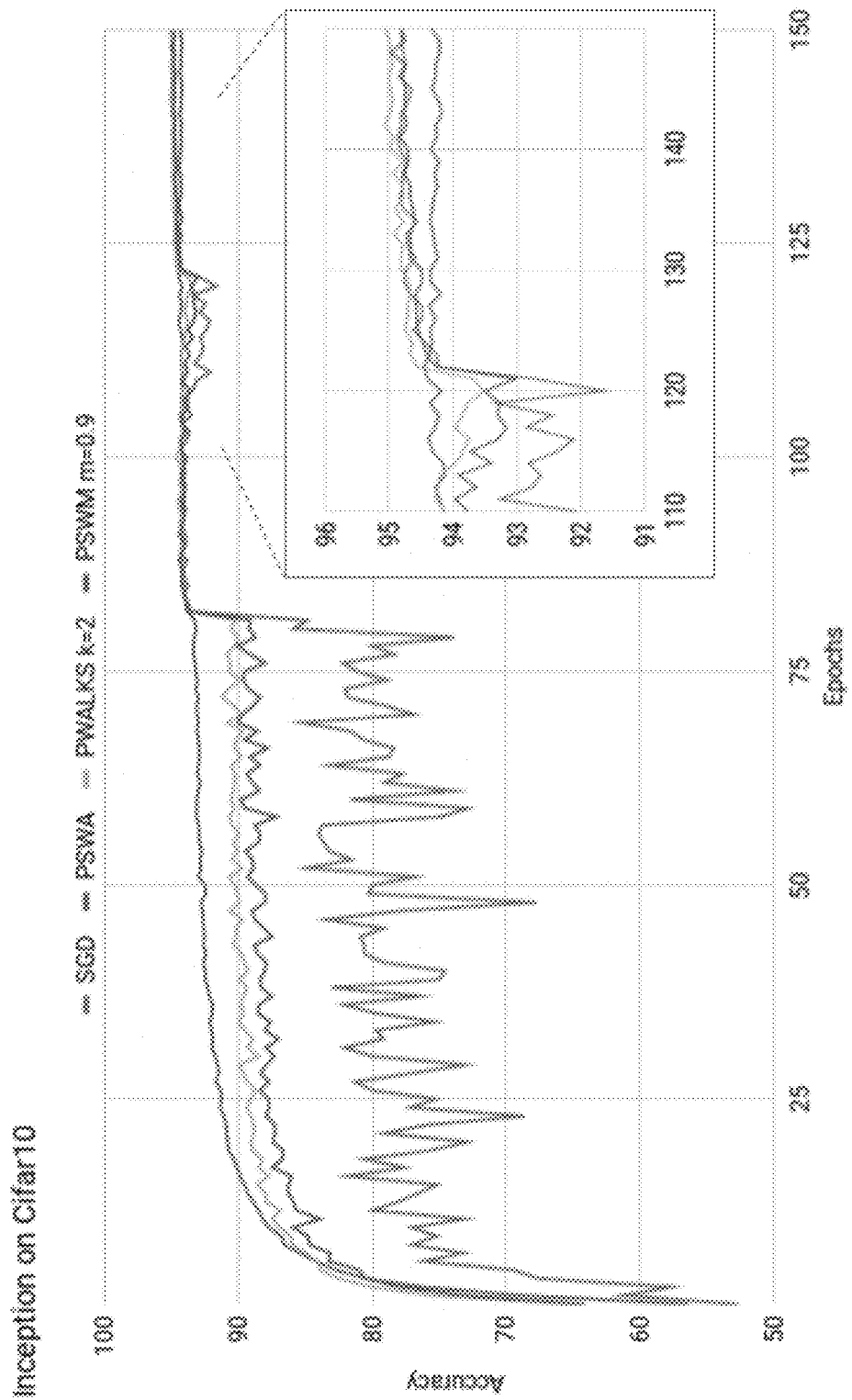
FIG. 13 is a diagram illustrating PSWA, PWALKS, and PSWM on a deeper network in accordance with some implementations.

FIG. 13 is a diagram illustrating PSWA, PWALKS, and PSWM on a deeper network in accordance with some implementations.

However, unlike the shallow networks shown in FIG. 12, FIG. 13 shows that, for deeper networks like Inception, DenseNet-121, and ResNet50, the PSWA method 400 does not converge properly, whereas the PWALKS method 700 and the PSWM method 900 do converge properly. FIG. 13 shows the Inception network trained using the same implementation as above. The results in FIG. 13 show that the PSWA method 400 and its variants reach 90% and 94% thresholds much faster consistently and while training on larger learning rate, while SGD needs a learning rate change by a factor of 10 to cross the thresholds.

Figure 14A:
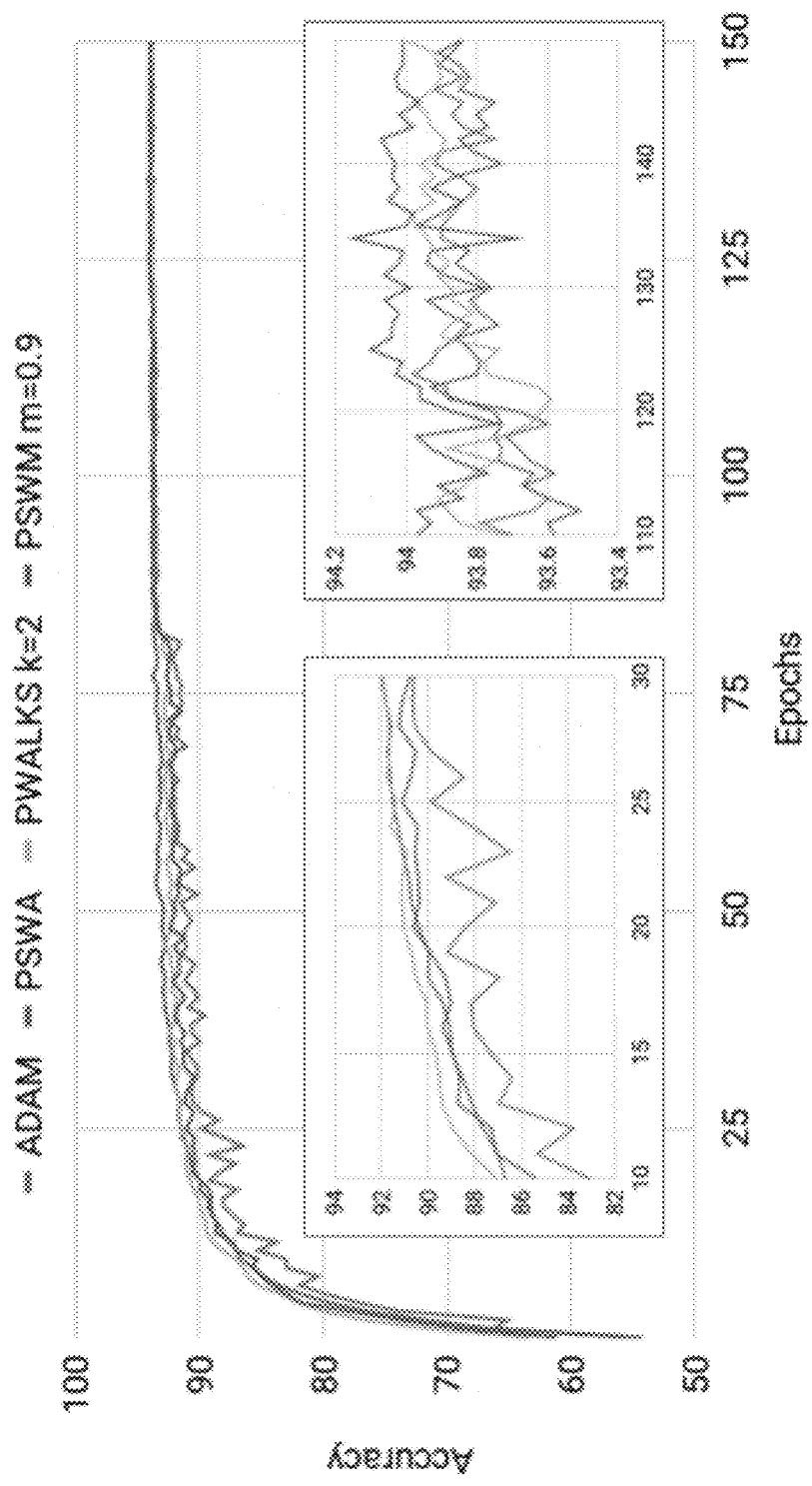
FIGS. 14A to 14B are diagrams illustrating PSWA, PWALKS, and PSWM on an adaptive optimizer in accordance with some implementations.
Figure 14B:
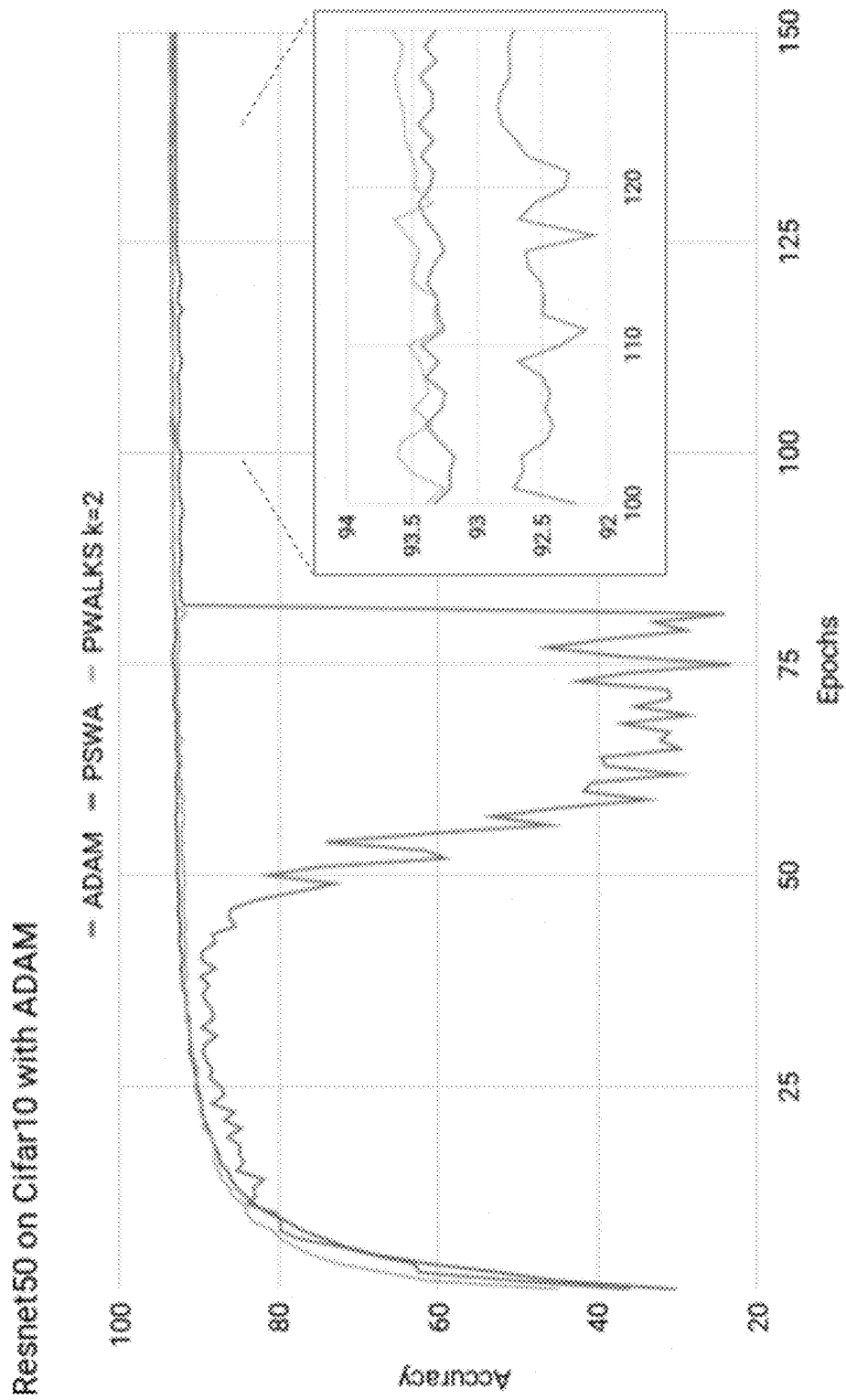

Until now, only SGD (with momentum-based optimizing) methods have been shown. As such, to show that the PSWA method 400, the PWALKS method 700, and the PSWM method 900 techniques can be effectively used on adaptive optimizers as well. FIGS. 14A-B show results from experiments on ADAM, which performs first-order gradient-based optimization of stochastic objective functions based, based on adaptive estimates of lower-order moments.

FIGS. 14A-B are diagrams illustrating PSWA, PWALKS, and PSWM on an adaptive optimizer in accordance with some implementations.

FIG. 14A-B shows the implementation of ResNet50 on Cifar10 consistent with prior implementations except the implementation uses ADAM instead of SGD and with a starting learning rate of 0.001. FIG. 14A shows the implementation of ResNet50 on Cifar10 consistent with prior implementations except for the use of ADAM instead of SGD, with a starting learning rate of 0.001. FIG. 14B shows the implementation of ResNet50 on Cifar10 consistent with prior implementations except for the use of ADAM instead of SGD, with a learning rate of 0.01.

As shown in FIG. 14A, the PSWA method 400, the PWALKS method 700, and the PSWM method 900 all offer marginal but consistent improvement on ADAM across minibatches of training data over multiple runs. The improvements in ADAM are not as significant and dramatic as SGD because ADAM itself alleviates the common problems of SGD such as large fluctuations and slow convergence. Since ADAM already modules the learning rate of each weight based on the magnitudes of its gradients, instead of the complete raw and noisy gradient vector, the distribution of the parameter weights remains small compared to SGD.

However, ADAM and other adaptive optimizers suffer from some important documented problems. For example, even though ADAM converges faster, ADAM does not generalize well. From the experiments, PSWA over ADAM also provided reduced cross entropy loss over training. Another problem for adaptive optimizers like RMSprop (a well-known optimization algorithm designed for neural networks) and ADAM is that they become unstable at high learning rate near convergence. This happens as the squares of rolling mean of gradients are used to divide the current gradient, in which case, very small gradients can introduce instability.

FIG. 14B shows the scenario where the experiment uses a l of 0.01 (instead of 0.001) which causes ADAM to become unstable. However, ADAM with the PSWA method 400 remains stable and converges better.

Figure 15A:
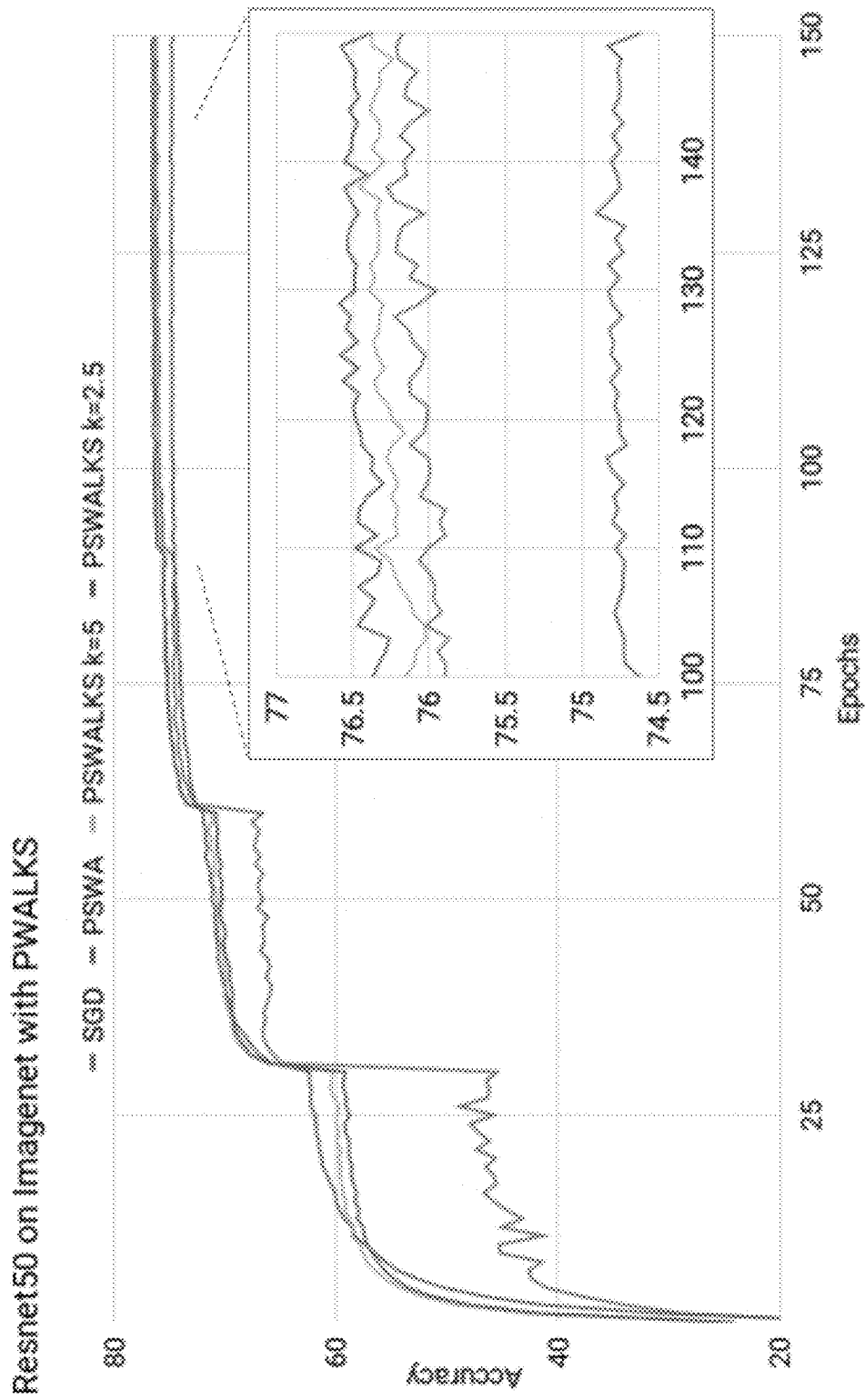
FIGS. 15A to 15B are diagrams illustrating the applications of ResNet50 on ImageNet with PWALKS and PSWM in accordance with some implementations.
Figure 15B:
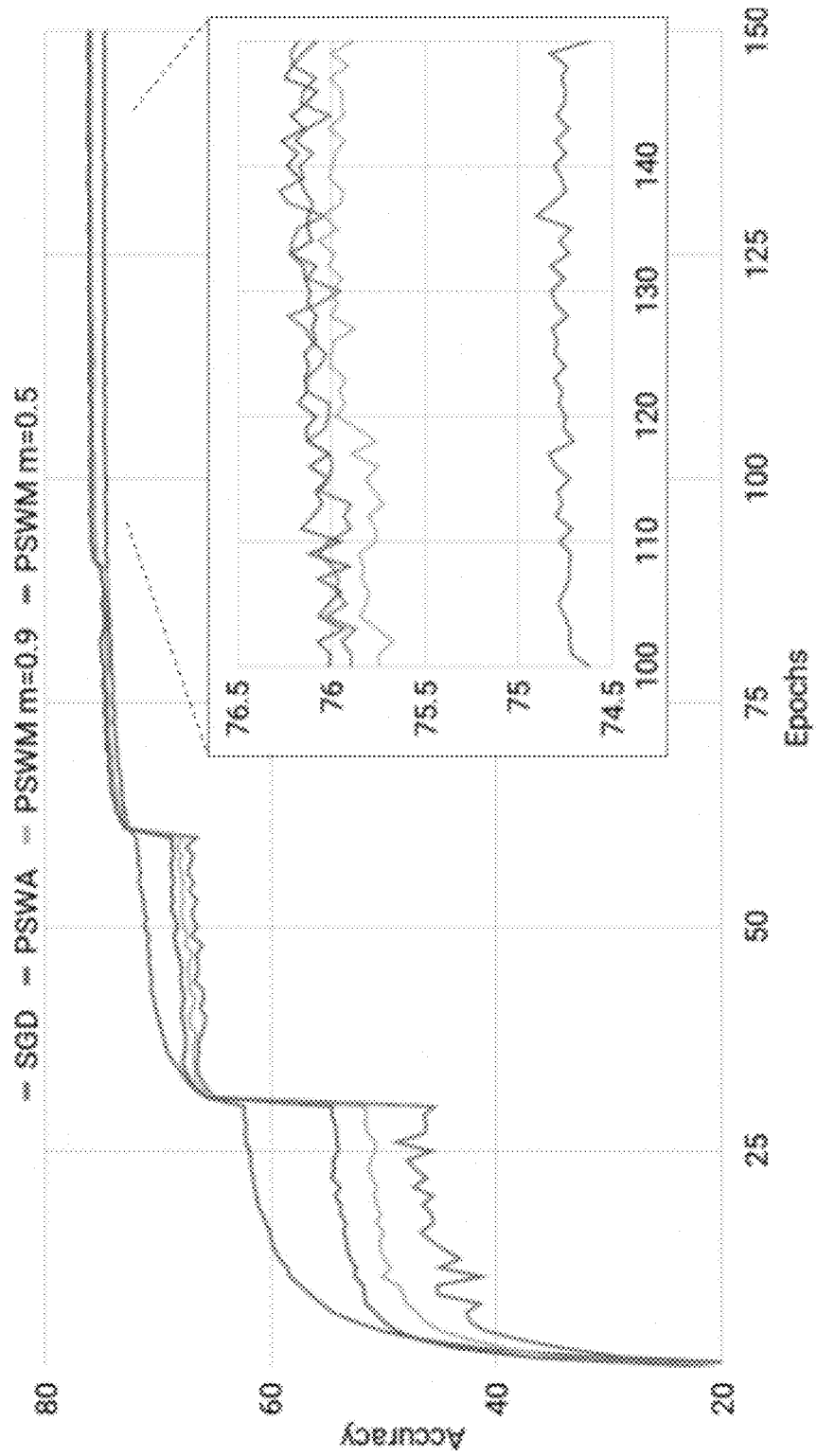

FIGS. 15A-B are diagrams illustrating the applications of ResNet50 on ImageNet with the PWALKS method 700 and the PSWM method 900 in accordance with some implementations. ImageNet is another standard image classification dataset that has 1.2 million high resolution images from 1000 classes. The implementations uses ResNet50 as the underlying network and SGD with momentum as the optimizer. The experiments also use learning rate with 0.1, which changes by a factor of 0.1 every 30 minibatches of training data, for a total of 150 minibatches of training data.

As shown in FIGS. 15A and 15B, the experimentation results on ImageNet follow similar trends as on Cifar10 in FIGS. 14A and 1B. Similar to the results from Cifar10, the PSWA method 400 converges much faster during early training, but does not converge optimally. In addition, the PWALKS method 700 performs a better generalization without compromising on final convergence over the PSWM method 900. However, both techniques provide improvement over SGD. An important threshold for ImageNet classification is 90% top-5 classification accuracy. In the experiments, SGD needs a learning rate of 0.001 to reach the threshold, while the PSWA method 400 and its variants cross the threshold with 0.01 learning rate and fewer minibatches of training data consistently.

Figure 16A:
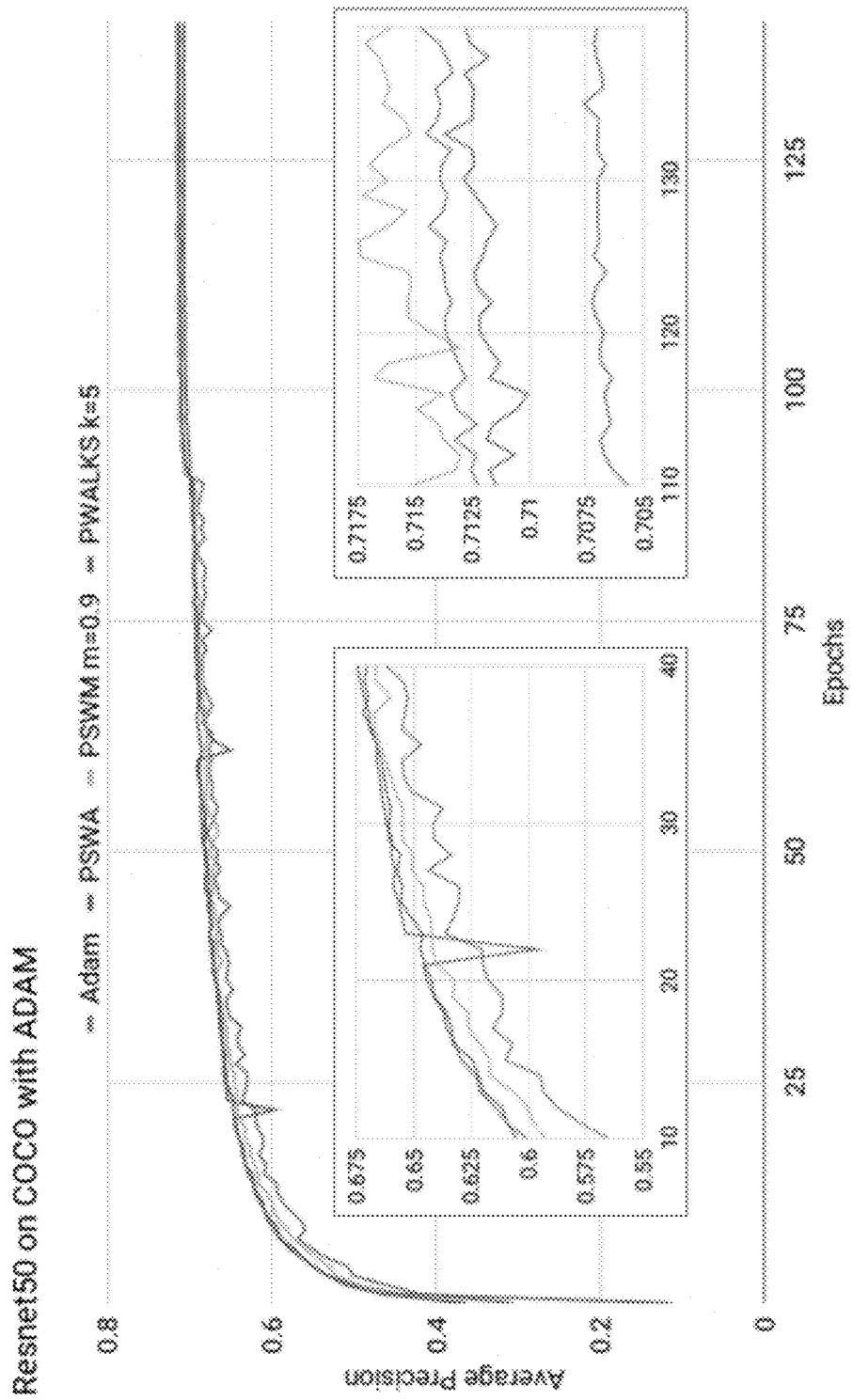
FIGS. 16A to 16B are diagrams illustrating the applications of PSWA, PWALKS, and PSWM on a human-pose detection task in accordance with some implementations.
Figure 16B:
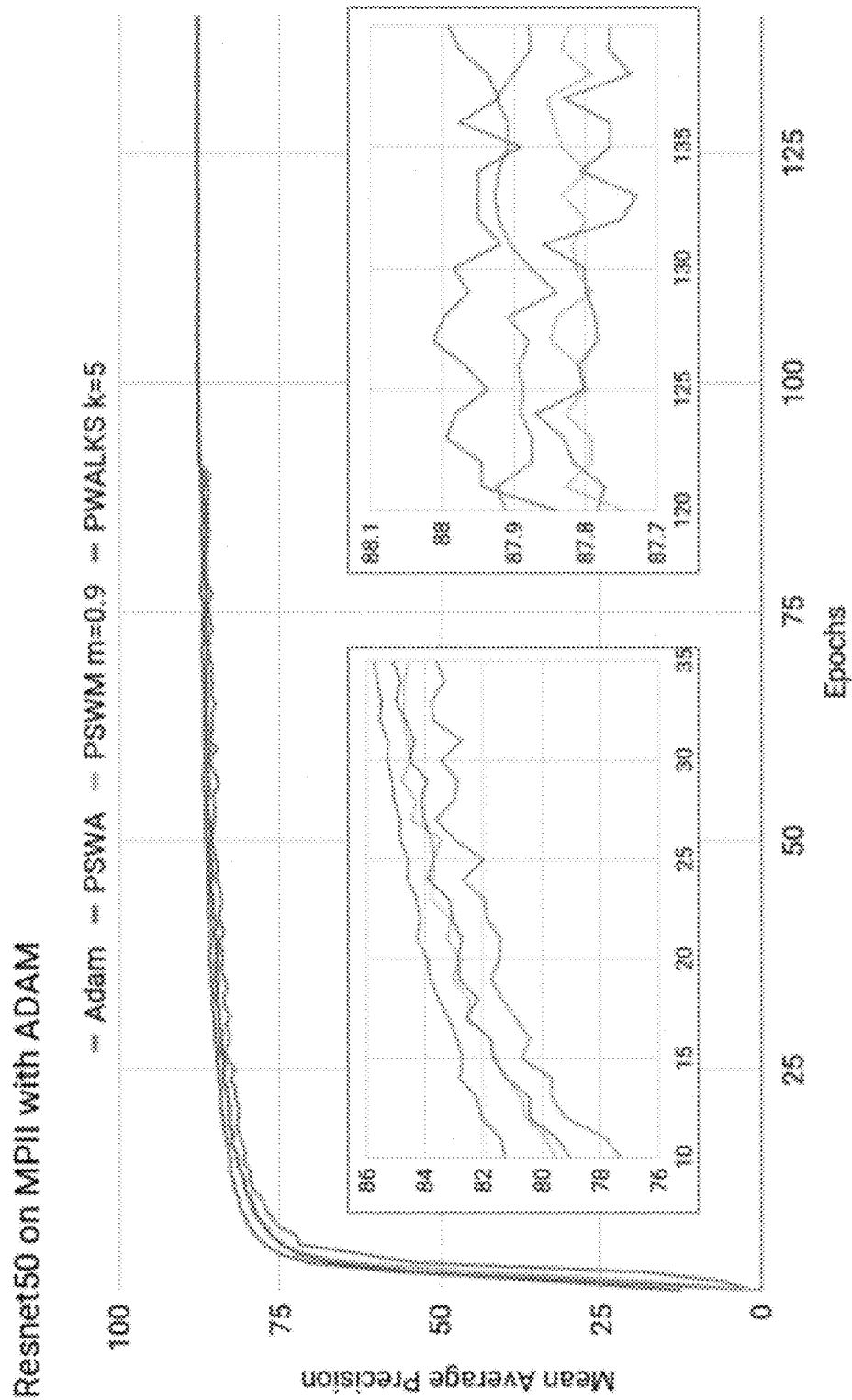

FIGS. 16A-B are diagrams illustrating the applications of PSWA, PWALKS, and PSWM on a human-pose detection task in accordance with some implementations. The PSWA method 400, the PWALKS method 700, and the PSWM method 900 techniques are applied to human keypoint detection on MS COCO (a well-known large-scale object detection, segmentation, and captioning dataset) and Human pose detection on MPII dataset (another well-known dataset for the evaluation of articulated human pose estimation). Both tasks use ResNet50 pretrained on ImageNet and perform transfer learning on the new dataset. Both experiments also use ADAM as the optimizer with a learning rate of 0.001. Consistent with the prior experiments, the PWALKS method 700 and the PSWM method 900 provide consistent improvement over ADAM in the early stages of training.

Figure 17A:
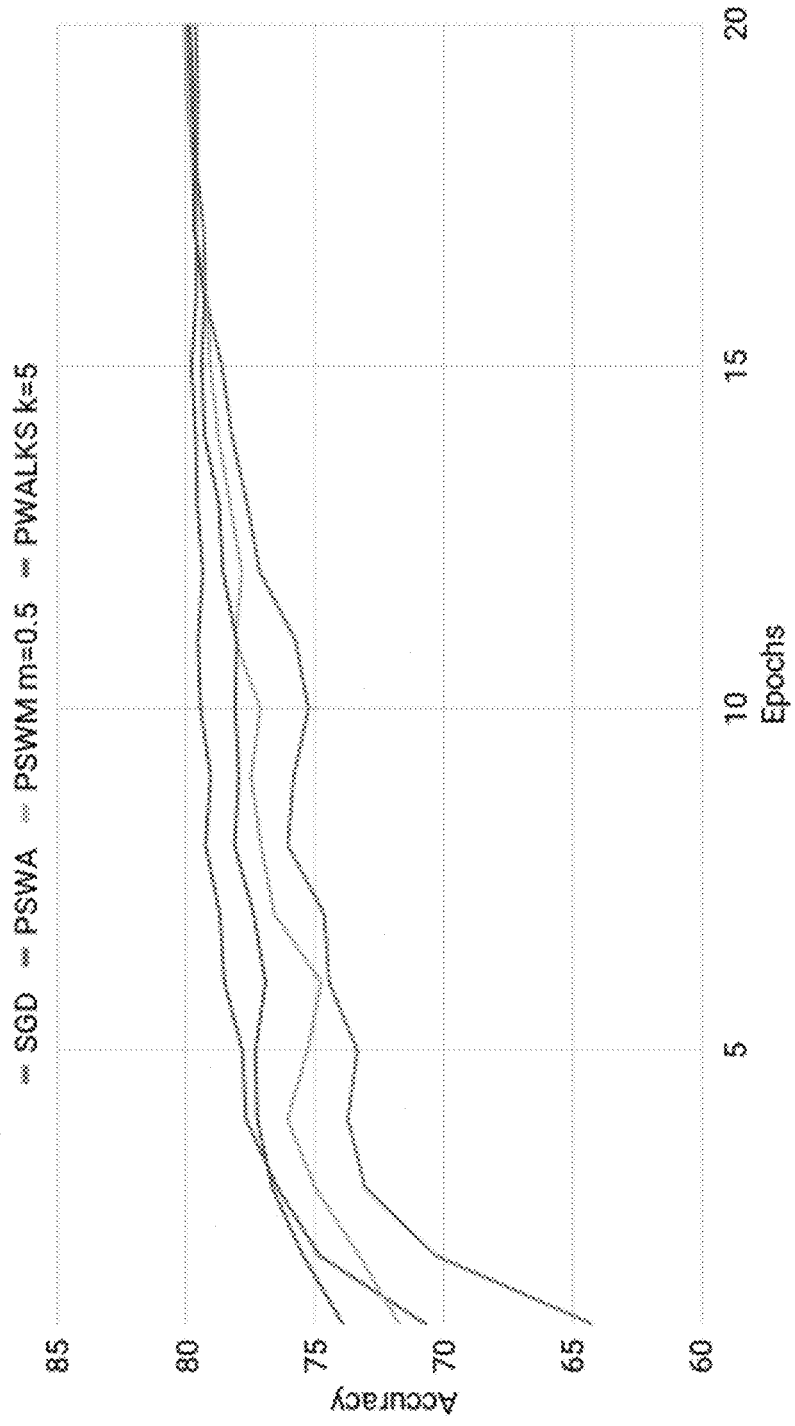
FIGS. 17A to 17B are diagrams illustrating the applications of PSWA, PWALKS, and PSWM on a segmentation task in accordance with some implementations.
Figure 17B:
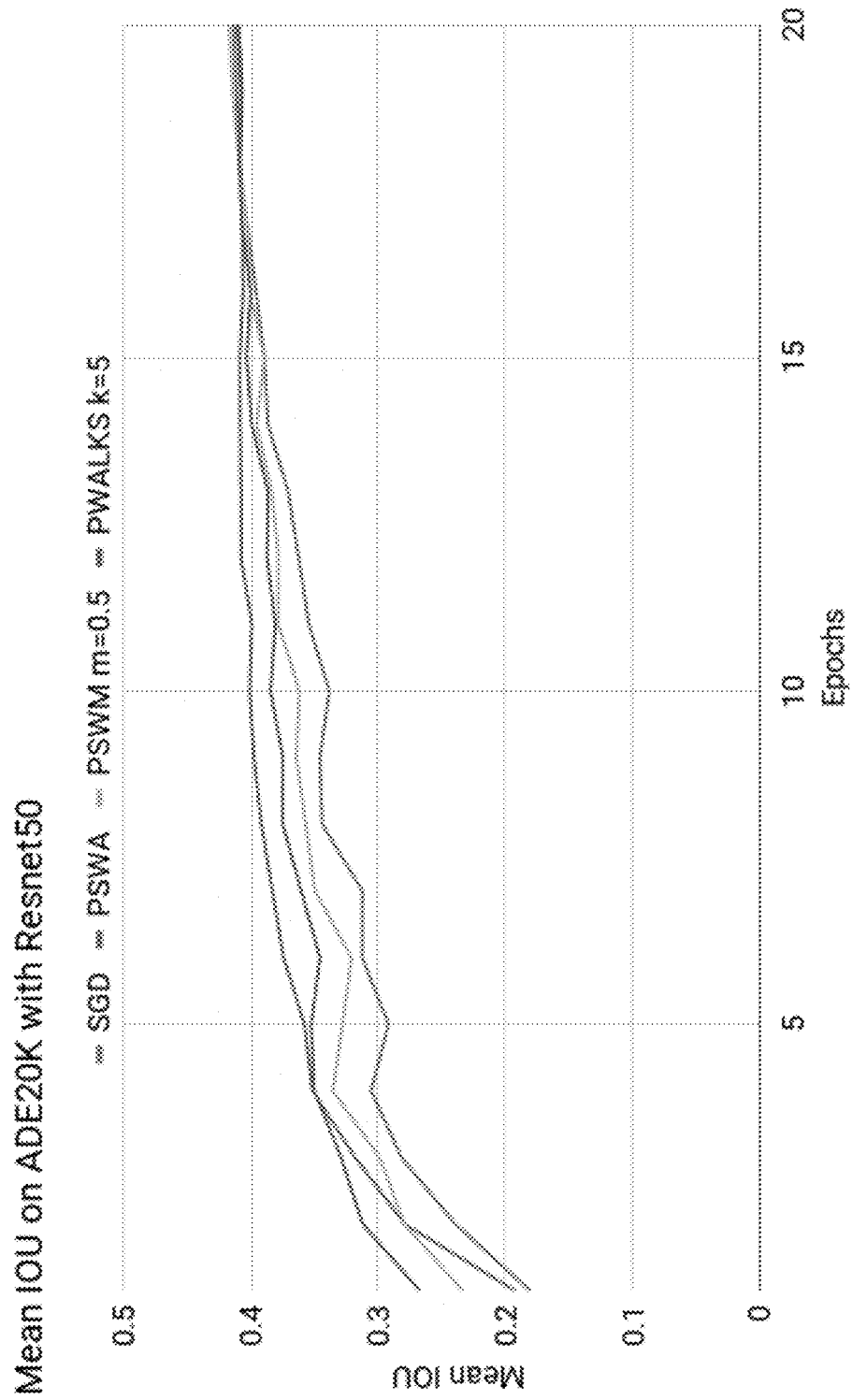

FIGS. 17A-B are diagrams illustrating the applications of the PSWA, PWALKS, and PSWM techniques on a segmentation task in accordance with some implementations. The PSWA method 400, the PWALKS method 700, and the PSWM method 900 techniques are applied to perform scene segmentation on MIT ADE20K dataset (a well-known dataset that contains the largest open source for semantic segmentation and scene parsing). The implementation uses an encoder-decoder architecture with ResNet50 pretrained on ImageNet as the encoder and Pyramid Pooling Module with Bilinear Upsampling as the decoder with deep supervision. The implementation uses per-pixel cross-entropy loss, SGD as the optimizer and a 'poly' learning rate policy.

The implementation initializes two distributions one each for the encoder and decoder. The implementation then updates both the distributions together and reassigns them at the end of the minibatch of training data. The implementation does not need to recalibrate the BN layers because the implementation uses Synchronized Batch Normalization (a well-known implementation of BN which increases the effective batch size for BN by using many GPUs).

FIG. 17A shows a pixel wise accuracy of the segmentation models on test set. FIG. 17B shows Mean Intersection-Over-Union (IOU) of the predicted-segmentation on test data, where PSWA provides significant improvements over SGD based training.

Figure 18A:
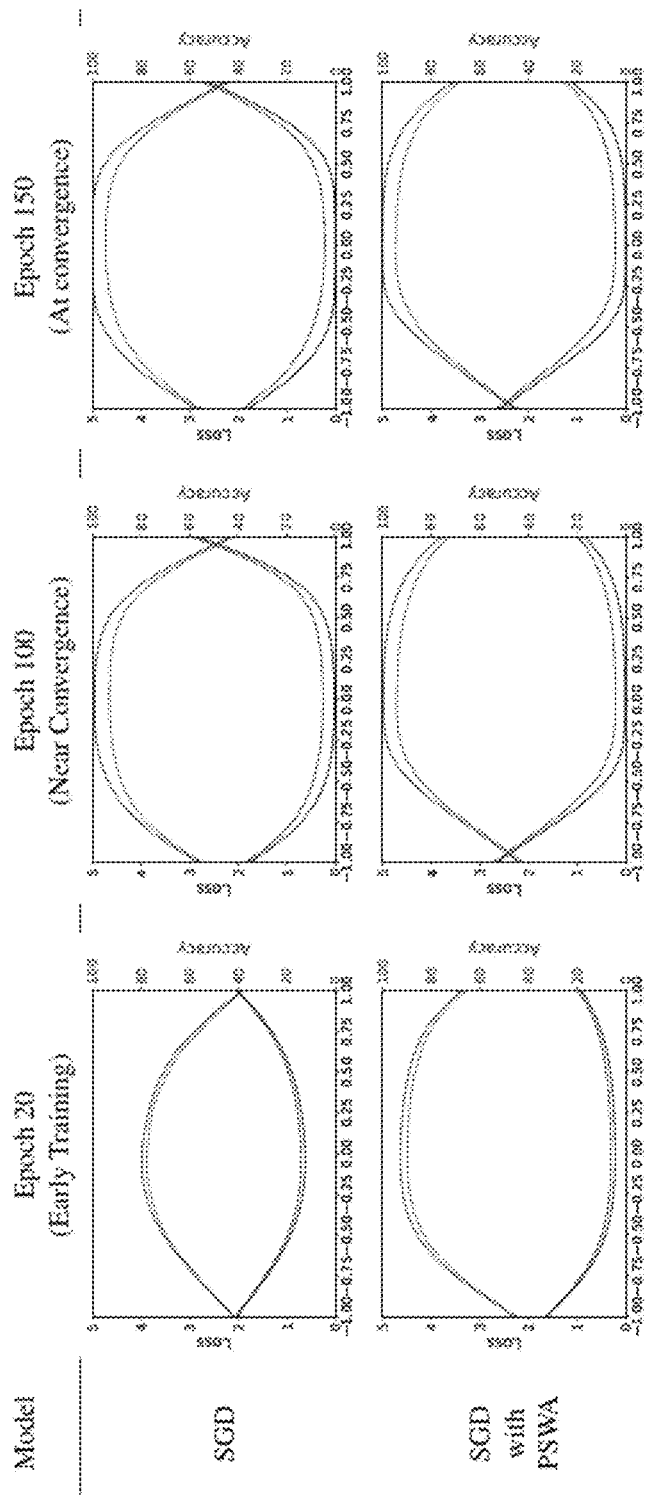
FIGS. 18A to 18B are diagrams of a comparison of loss surface with SGD and PSWA at different training stages in accordance with some implementations.
Figure 18B:
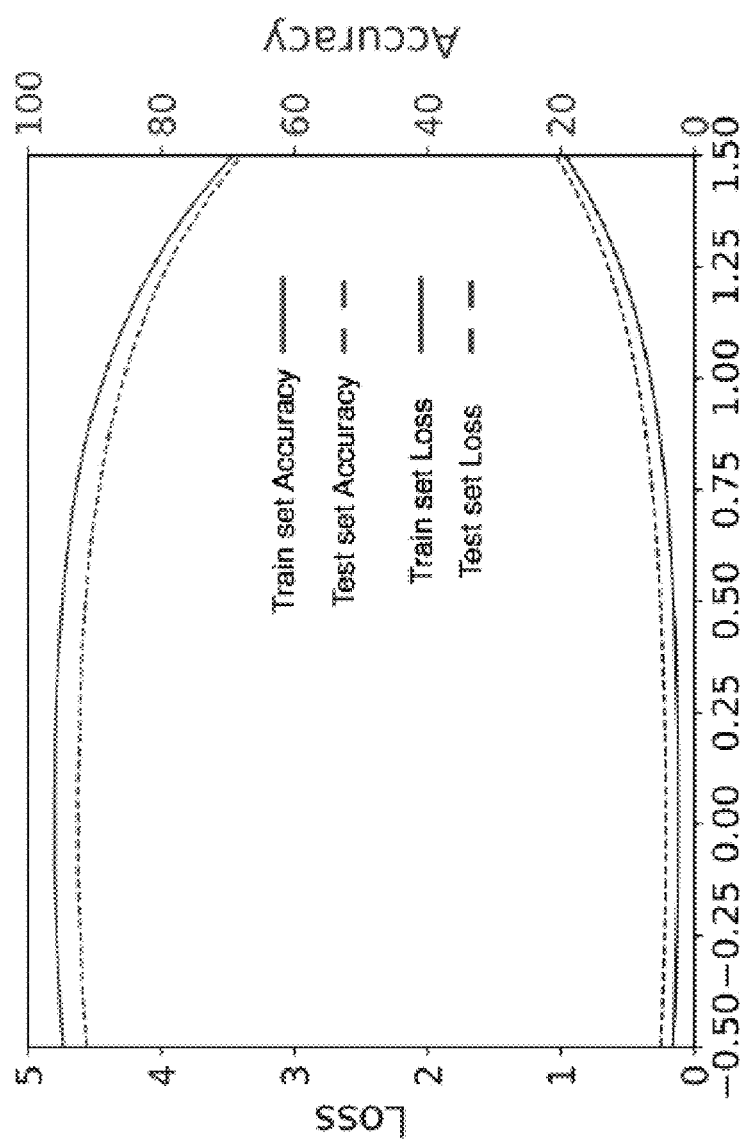

FIGS. 18A-B are diagrams of a comparison of loss surface with SGD and PSWA at different training stages. In order to better understand the results of PSWA method 400, the PWALKS method 700, and the PSWM method 900 techniques, the effect of the PSWA method 400 on the loss surface of the model during training when compared to SGD should be investigated. Training neural networks requires minimizing a high-dimensional non-convex loss function with a deeper minima correlating with better performance. An important characteristic of the minima is its 'flatness' or the measure of size of the connected region around the minimum where the training loss remains low. A "flat" minima may generalize better while increased sharpness of a minima could indicate low generalization.

FIG. 18A shows loss surface comparison at different stages of training—the beginning, near convergence, and at convergence on ResNet18 for Cifar10 trained by SGD and SGD with the PSWA method 400. The horizontal axis represents the displacement of the random Gaussian direction vector; the red lines indicate accuracy and the blue lines indicate the loss values; the dashed lines represent the values on the test dataset while the solid lines represent the training set. As is clearly evident, the model trained by the PSWA method 400 has much flatter and deeper minima, for both training and testing set, at the early training stage. The trend continues for near convergence stage and at convergence, though it becomes less pronounced.

FIG. 18B shows a different representation of the loss surface at early training stage ($50^{th}$ minibatch), before and after reassigning the model weights. The PSWA-based model is located at index 0 on the horizontal axis and SGD model at index 1, while variables between them represent the displacement in the "filter normalized" direction between the weights (since the implementation uses the same model). FIG. 18B shows steady improvements in the direction of weights after PSWA is applied.

FIGS. 19A-C shows a volatility analysis of training ResNet50 on ImageNet. While FIGS. 12 to 18B show that the PSWA method 400 and its variants converge consistently and more robustly than the baseline models—it is non-trivial to quantify this performance improvement as both the accuracy and loss functions form a non-stationary and volatile time-series.

As shown in FIG. 19A, an analysis of the test accuracy distribution with ResNet50 over ImageNet shows that the PSWA method 400, the PWALKS method 700, and the PSWM method 900 techniques provide consistent and significantly lower standard deviation both at convergence and over the saturation phases at constant learning rates. The lower variance at early saturation phase (minibatches 20-30) points to a less volatile training process and the lower variance at the final 20 minibatches point to a more stable convergence. Moreover, the PWALKS method 700 and the PSWM method 900 both converge optimally compared to SGD across a wide range of hyperparameters.

Another important observation is that the performance of the PSWA method 400 on the test set monotonically increases or remains stable over minibatches of training data until convergence. This is especially important since it indicates that with a high probability, the model is consistently improving, and the performance does not sporadically fluctuate like the baseline mode. An analysis of the test accuracy distribution with ResNet50 over ImageNet finds that for almost 70% consecutive minibatches of training data with the PSWA method 400, the accuracy improves or 95% of them are stable within 0.2 percentage range decrement, unlike SGD-based training which only shows 57% and 77% respectively.

FIG. 19B compares performance improvements between current minibatches of training data and best overall performance over minibatches of training data and presents the stability within 0.2 percentage range decrement. As shown in FIG. 19B, the PSWA method 400 improves upon best pervious performance or remains stable for 99% of the minibatches of training data.

FIG. 19C shows that the PSWA, PWALKS, and PSWM techniques provide consistently better generalization and higher expected accuracy at intermediate minibatches of training data and early minibatches of training data.

The PSWA method 400 can converge efficiently and excel when applied to smaller networks, the PWALKS method 700 and the PSWM method 900 work across deeper and more complex networks and converge optimally while still providing the same improvements of the PSWA method 400. While both the PWALKS method 700 and the PSWM method 900 offer optimal convergence, both the PWALKS method 700 and the PSWM method 900 techniques depend on hyperparameters 'k' and 'm' respectively and converge optimally to within a small margin to each other across a wide range of their hyperparameter values. However, the PWALKS method 700 does offer minor improvements over the PSWM method 900 during early stages of training.

Figure 20:
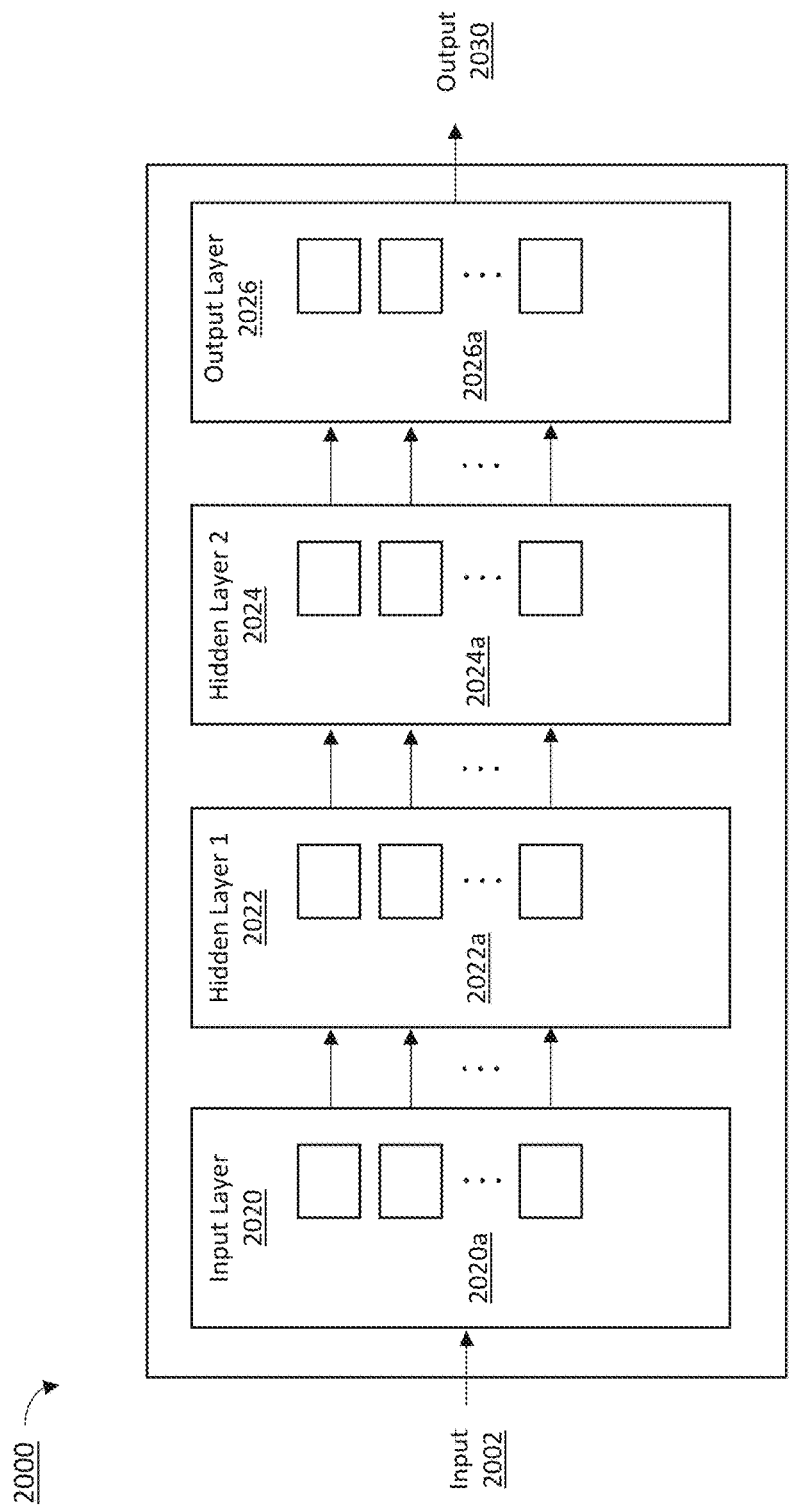
FIG. 20 is a block diagram of an example neural network in accordance with some implementations.

FIG. 20 is a block diagram of an example neural network 2000 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 2000 includes an input layer 2020, a first hidden layer 2022, a second hidden layer 2024, and an output layer 2026. While the neural network 2000 includes two hidden layers as an example, those of ordinary skill in the art will appreciate from the present disclosure that one or more additional hidden layers are also present in various implementations.

Adding additional hidden layers adds to the computational complexity and memory demands but may improve performance for some applications.

In various implementations, the input layer 2020 is coupled (e.g., configured) to receive various inputs 2002 (e.g., image data). For example, the input layer 2020 receives pixel data from one or more image sensors (e.g., the sensor 240 shown in FIG. 2). In various implementations, the input layer 2020 includes a number of long short-term memory (LSTM) logic units 2020a, which are also referred to as model(s) of neurons by those of ordinary skill in the art. In some such implementations, an input matrix from the features to the LSTM logic units 2020a include rectangular matrices. For example, the size of this matrix is a function of the number of features included in the feature stream.

In some implementations, the first hidden layer 2022 includes a number of LSTM logic units 2022a. In some implementations, the number of LSTM logic units 2022a ranges between approximately 10-500. Those of ordinary skill in the art will appreciate that, in such implementations, the number of LSTM logic units per layer is orders of magnitude smaller than previously known approaches (being of the order of $O(10^1)$ to $O(10^2)$), which allows such implementations to be embedded in highly resource-constrained devices. As illustrated in the example of FIG. 20, the first hidden layer 2022 receives its inputs from the input layer 2020. For example, the first hidden layer 2022 performs one or more of following: a convolutional operation, a nonlinearity operation, a normalization operation, a pooling operation, and/or the like.

In some implementations, the second hidden layer 2024 includes a number of LSTM logic units 2024a. In some implementations, the number of LSTM logic units 2024a is the same as or similar to the number of LSTM logic units 2020a in the input layer 2020 or the number of LSTM logic units 2022a in the first hidden layer 2022. As illustrated in the example of FIG. 20, the second hidden layer 2024 receives its inputs from the first hidden layer 2022. Additionally and/or alternatively, in some implementations, the second hidden layer 2024 receives its inputs from the input layer 2020. For example, the second hidden layer 2024 performs one or more of following: a convolutional operation, a nonlinearity operation, a normalization operation, a pooling operation, and/or the like.

In some implementations, the output layer 2026 includes a number of LSTM logic units 2026a. In some implementations, the number of LSTM logic units 2026a is the same as or similar to the number of LSTM logic units 2020a in the input layer 2020, the number of LSTM logic units 2022a in the first hidden layer 2022, or the number of LSTM logic units 2024a in the second hidden layer 2024. In some implementations, the output layer 2026 is a task-dependent layer that performs a computer vision related task such as feature extraction, object recognition, object detection, pose estimation, or the like. In some implementations, the output layer 2026 includes an implementation of a multinomial logistic function (e.g., a soft-max function) that produces a number of outputs 2030.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Implementations according to the present disclosure described above may be implemented in the form of computer programs that may be executed through various components on a computer, and such computer programs may be recorded in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example implementations described above or by the use of such terms unless limited by the appended claims. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned implementations, and it is intended that not only the appended claims, but also all changes equivalent to claims, should be considered to fall within the scope of the present disclosure.

What is claimed is:

1. A computer-implemented method for training a neural network, the computer-implemented method comprising:
   initializing one or more model parameters for training the neural network;
   performing a forward pass and back propagation for a minibatch of training data comprising a plurality of batches of training data;

determining a new weight value for each of a plurality of nodes of the neural network based on an optimization algorithm;

for each determined new weight value, determining whether to update a running mean corresponding to a weight of each node from the plurality of nodes, wherein determining whether to update the running mean is based on:

whether a current batch of training data falls within a predefined last subset of batches of the minibatch; and performing a random determination having a probability based on a value included in the one or more model parameters;

based on a determination to update the running mean, calculating a new mean weight value for each node using the determined new weight value, wherein when the current batch of training data does not fall within the predefined last subset of batches of the minibatch, the running mean is not updated using the determined new weight value;

updating weight parameters for all nodes based on the calculated new mean weight values corresponding to each node;

assigning the running mean as the weight for each node when training on K number of minibatches is completed, wherein K is a predefined number; and reinitializing running means for all nodes in the neural network at a start of training a K+1 minibatch of the training data.

2. The computer-implemented method of claim 1, further comprising storing the running mean corresponding to the weight of each node before updating the running mean as a current running mean, wherein the running mean is reinitialized to a value of the stored running mean.

3. The computer-implemented method of claim 1, wherein the value included in the one or more model parameters is a percentage representing a desired sampling percentage of the minibatch for updating the running mean.

4. The computer-implemented method of claim 1, wherein the one or more model parameters includes a percentage value representing the predefined last subset of batches with respect to a total number of batches of the minibatch.

5. The computer-implemented method of claim 4, further comprising reinitializing the running mean for each node for performing training on a next minibatch of training data.

6. The computer-implemented method of claim 4, wherein the percentage value representing the predefined last subset of batches is in a range of 2 to 5%.

7. The computer-implemented method of claim 1, wherein the determined new weight value is based on a running momentum term included in the one or more model parameters.

8. The computer-implemented method of claim 7, wherein the running momentum term is updated after each batch of the minibatch such that new weight values for calculating the new mean weight value are increasingly weighted toward an end of the minibatch.

9. An edge device comprising one or more processors; a non-transitory memory; and one or more programs stored in the non-transitory memory, which, when executed by the one or more processors, cause the edge device to be configured to perform:

initializing one or more model parameters for training a neural network;

performing a forward pass and back propagation using a minibatch of training data comprising a plurality of batches of training data;

determining a new weight value for each of a plurality of nodes of the neural network based on an optimization algorithm;

for each determined new weight value, determining whether to update a running mean corresponding to a weight of each node from the plurality of nodes, wherein determining whether to update the running mean is based on:

whether a current batch of training data falls within a predefined last subset of batches of the minibatch; and performing a random determination having a probability based on a value included in the one or more model parameters;

based on a determination to update the running mean, calculating a new mean weight value for each node using the determined new weight value, wherein when the current batch of training data does not fall within the predefined last subset of batches of the minibatch, the running mean is not updated using the determined new weight value;

updating weight parameters for all nodes based on the calculated new mean weight value corresponding to each node;

assigning the running mean as the weight for each node when training on K number of minibatches is completed, wherein K is a predefined number; and reinitializing running means for all nodes in the neural network at a start of training a K+1 minibatch of the training data.

10. The edge device of claim 9, wherein the determined new weight value is based on a running momentum term included in the one or more model parameters.

11. A non-transitory memory storing one or more programs, which, when executed by the one or more processors of an edge device, cause the edge device to be configured to perform:

initializing one or more model parameters for training a neural network;

performing a forward pass and back propagation using a minibatch of training data comprising a plurality of batches of training data;

determining a new weight value for each of a plurality of nodes of the neural network based on an optimization algorithm;

for each determined new weight value, determining whether to update a running mean corresponding to a weight of each node from the plurality of nodes, wherein determining whether to update the running mean is based on:

whether a current batch of training data falls within a predefined last subset of batches of the minibatch; and performing a random determination having a probability based on a value included in the one or more model parameters;

based on a determination to update the running mean, calculating a new mean weight value for each node using the determined new weight value, wherein when the current batch of training data does not fall within the predefined last subset of batches of the minibatch, the running mean is not updated using the determined new weight value;

updating weight parameters for all nodes based on the calculated new mean weight values corresponding to each node;

assigning the running mean as the weight for each node when training on K number of minibatches is completed, wherein K is a predefined number; and reinitializing running means for all nodes in the neural network at a start of training a K+1 minibatch of the training data.

12. The non-transitory memory of claim 11, wherein the determined new weight value is based on a running momentum term included in the one or more model parameters.

13. The non-transitory memory of claim 12, wherein the running momentum term is updated after each batch of the minibatch such that new weight values for calculating the new mean weight value are increasingly weighted toward an end of the minibatch.

* * * * *